United States Patent
Rose

(10) Patent No.: US 7,436,359 B1
(45) Date of Patent: Oct. 14, 2008

(54) METHOD FOR SINGLE SATELLITE GEOLOCATION OF EMITTERS USING AN AMBIGUOUS INTERFEROMETER ARRAY

(75) Inventor: Conrad M. Rose, King George, VA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 0 days.

(21) Appl. No.: 11/806,179

(22) Filed: May 30, 2007

(51) Int. Cl.
   *G01S 5/04* (2006.01)
(52) U.S. Cl. .................. 342/424; 342/442; 342/443
(58) Field of Classification Search ................. 342/424, 342/427, 434, 442, 443
   See application file for complete search history.

(56) References Cited

U.S. PATENT DOCUMENTS

| | | | |
|---|---|---|---|
| 3,935,574 A | 1/1976 | Pentheroudakis | |
| 5,412,388 A | 5/1995 | Attwood | |
| 5,457,466 A | 10/1995 | Rose | |
| 5,572,220 A | 11/1996 | Cai | |
| 5,608,411 A | 3/1997 | Rose | |
| 6,016,999 A | 1/2000 | Simpson et al. | |
| 6,417,799 B1 | 7/2002 | Aubain et al. | |
| 6,421,008 B1 | 7/2002 | Dybdal et al. | |
| 6,583,755 B2 | 6/2003 | Martinerie et al. | |

OTHER PUBLICATIONS

Analysis and Synthesis of General Planar Interferometer Arrays, 1983 IEEE ICASSP.

*Primary Examiner*—Dao L Phan

(57) ABSTRACT

A method of locating a terrestrial emitter of electromagnetic radiation in the midst of a plurality of emitters in a satellite in orbit about the earth which utilizes a location estimation and location probability determination process with respect to each possible emitter site and its corresponding error region and then using both feedback and feed forward interaction between location and phase ambiguity resolution processes to generate resolved phase from emitter location, update emitter location or some or all of the emitters, and subsequently utilizing the probabilities thus determined to produce a single estimate of the desired emitter's location.

24 Claims, 14 Drawing Sheets

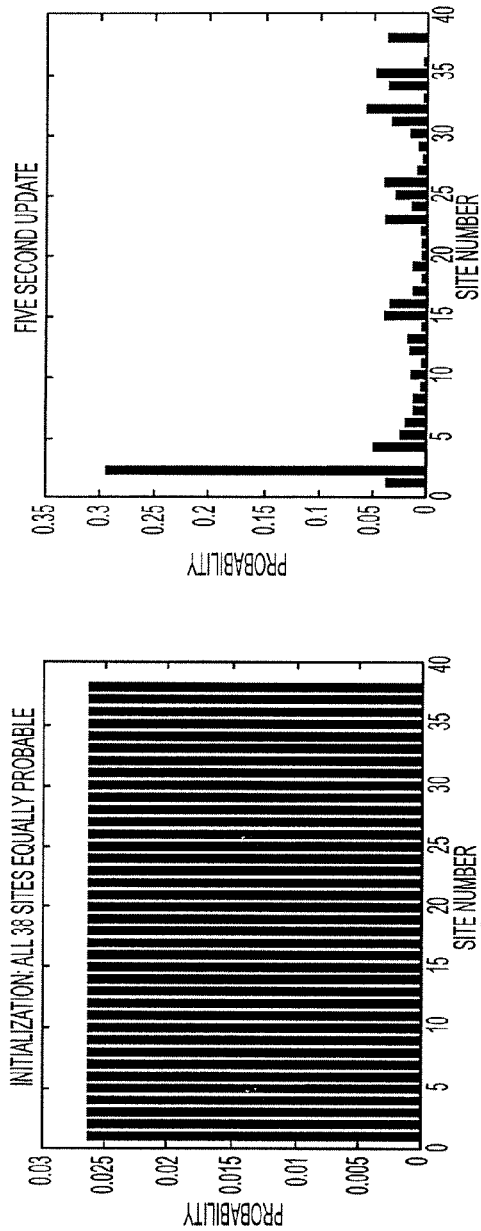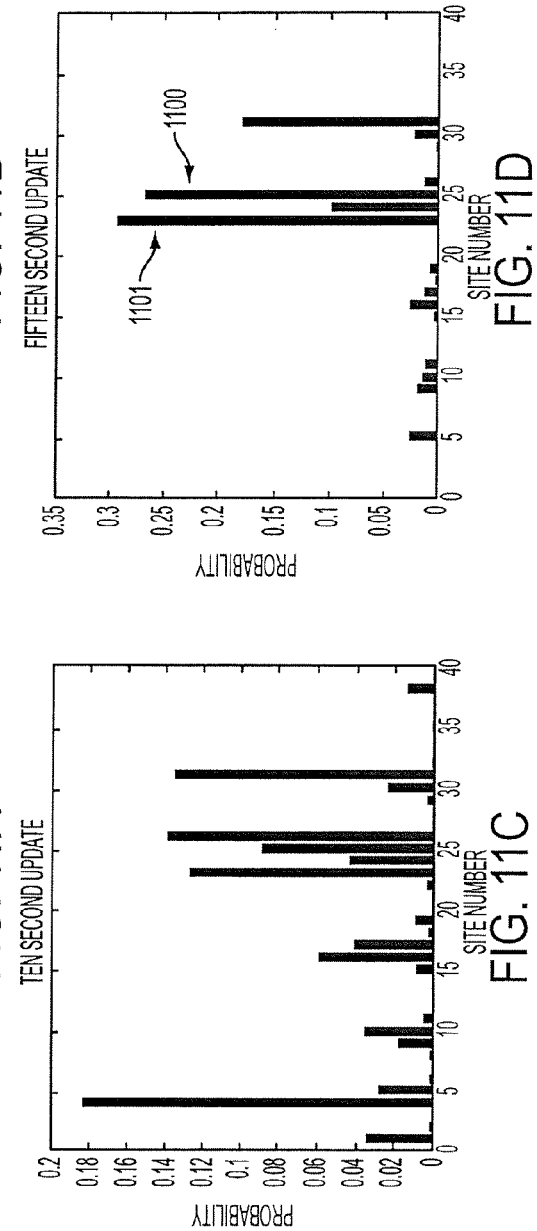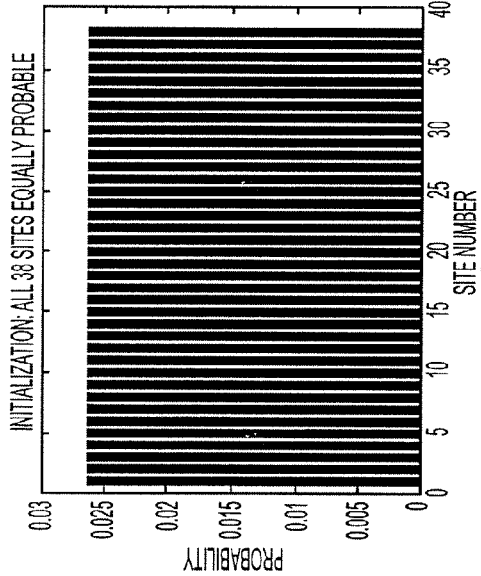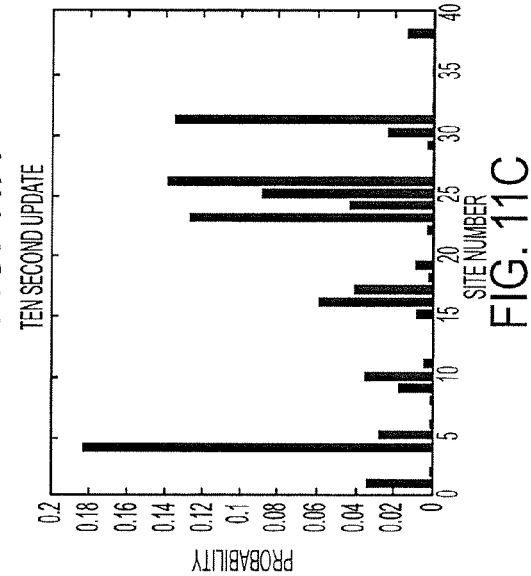

METHOD FOR SINGLE SATELLITE GEOLOCATION OF EMITTERS USING AN AMBIGUOUS INTERFEROMETER ARRAY

BACKGROUND OF THE INVENTION

1. Field of Invention

This invention relates generally to the location of objects from space via a satellite and, more particularly, to the accurate geolocation of possibly non-cooperative emitters from a single low earth orbit (LEO) satellite utilizing the minimum number of antennas required to derive ambiguous emitter direction of arrival.

2. Description of Related Art

Geolocation as used here refers to the determination of the emitter in both earth-center inertial (ECI) coordinates, and geodetic latitude and longitude. Using satellites to locate ground emitters is an important civilian and military task. Examples are emergency rescue of downed aircraft, determination of inadvertent sources of communications interference and location of malicious jammers disrupting military satellite usage. The transmitters may or may not aid or cooperate in their location.

Cooperative emitter location can take many forms. A common method is to transmit a stable CW narrow band signal. These signals may be continuous, or sent in burst; however, the transmitters always endeavor to be on during ranging. This allows a single LEO satellite to locate the emitter using the signal frequency's Doppler shifts. To provide location to a useable accuracy, a typical transmitter requirement is frequency stability of one part in $10^{-8}$ for twenty minutes over a wide range of adverse climatic conditions. Thus the transmitter is specifically designed and built to facilitate its location.

Non cooperative transmitters are not necessarily attempting to avoid geolocation. That is just not their reason for operating. Hence they are not required to have the frequency stability needed for delta-Doppler shift location, nor are they required to transmit for an extended period. However, rapid, accurate location of these non cooperative emitters becomes important when they interfere with satellite communication.

This interference is not necessarily malicious. The Ku band and C band of the electromagnetic spectrum are crowded, and inadvertent interference is commonplace. By contrast, X band activity is generally military, and interference is typically hostile. But whether inadvertent or hostile, the geolocation method used to find non-cooperative interferers must quickly produce emitter latitude and longitude or its equivalent to an accuracy eventually providing unique identification. Multiple satellite solutions have heretofore been favored for this. Using multiple satellites means Doppler shift techniques can still be used, but now it is the shift measured simultaneously between satellite pairs. So the emitter frequency stability requirement is not nearly as stringent as when locating using dwell-to-dwell measurements.

Thus simultaneous intercept of the interfering signals is a strong point of multiple satellite solutions. But it is also a problem since the emitter must lie simultaneously within the field of view of all the satellites, and be simultaneously detected by them.

To minimize the impact of these problems, U.S. Pat. No. 6,417,799, "Method of Locating an Interfering Transmitter for a Satellite Telecommunications System", Aubain et al., discloses a known two satellite solution. They reduce the number of satellites required to two by using combinations of three measurements: (a) signal time difference of arrival (TDOA) between the two satellites; (b) frequency Doppler difference (FDOP) between the two satellites; and, (c) signal angle of arrival (AOA) using an interferometer on a single satellite. The implementation Aubain et al uses in U.S. '799 to illustrate their method is locating the jammer of a geosynchronous orbit (GEO) telecommunications satellite. A second special "detection" satellite is in a LEO orbit with an interferometer mounted on it. Aubain assumes a linear interferometer as shown in FIG. 1 of subject applicant's set of drawings where a linear interferometer measures phase ($\phi$) 104 and from this obtains the angle ($\theta$) of arrival (AOA) 100 between the baseline vector ($\vec{d}$) 101 and normal to the signal wavefront, or direction of arrival (DOA) unit vector ($\vec{\mu}$) 102.

Thus the linear interferometer determines a cone 103 that the emitter DOA vector lies on. The cone intersects the earth giving a line of position (LOP) for the emitter. The intersection of this cone with a tangent plane at the emitter is a conic section, usually a parabola. This parabolic LOP has a thickness or uncertainty due to the interferometer phase measurement error ($\epsilon$) 106. The AOA error is reduced by extending the baseline length 101 between the antenna phase centers. It is also reduced at higher emitter frequencies, or shorter signal wavelengths ($\lambda$) 107.

Aubain et al. uses the interferometer in two ways. First, frequency and time measurements are performed and the resulting TDOA and FDOP LOP have multiple points of intersection. The AOA parabola then provides an additional measurement picking out the correct intercept. In this application the extent of the AOA error or, equivalently, the thickness of the parabolic LOP is not critical because the TDOA and FDOP lines of position determine the location accuracy. The second way the interferometer is used is with either a TDOA or FDOP measurement. For example, assume TDOA and AOA intercepts determine the emitter position. Then resolving the multiple intersections is accomplished by sequential dwells. As the LEO satellite moves the parabolic and hyperbolic LOP generated at each receiver dwell intersect near the emitter with an uncertainty due to their thickness. So in this case the AOA uncertainty is critical.

Increasing the spacing between the antenna phase centers, i.e., increasing the baseline vector ($\vec{d}$) 101 length, proportionally improves the LOP accuracy. However, increasing the baseline length beyond a half wavelength ($\lambda/2$) of the signal source generates phase measurement ambiguities 105. Here n 105 is an integer reducing the true phase so the measured phase ($\phi$) 104 lies in the region $-\pi \leq \phi < \pi$. This means that interferometer phase is measured modulo $2\pi$.

Determining ambiguity integers to recover the true phase requires special processing, an example of which is described by Malloy in a 1983 IEEE ICASSP paper entitled "Analysis and Synthesis of General Planar Interferometer Arrays." See also U.S. Pat. No. 6,421,008, "Method to Resolve Interferometric Ambiguities" Dybdal and Rousseau, and U.S. Pat. No. 5,572,220, "Technique to Detect Angle of Arrival with Low Ambiguity", Khiem V. Cai.

These results show eliminating the phase measurement integer ambiguities requires adding additional antennas between the outermost elements. Thus a linear interferometer installed to robustly and fully implement Aubain's method as taught in U.S. '799 may actually resemble FIG. 2 of applicant's drawings, not FIG. 1. In FIG. 2, antennas 203 and 204 are added to determine the integers $n_t$ 207 to resolve the phase measurement ($\phi_1$) 205, and hence find the angle of arrival ($\theta$) 206 from the true phase resolved phase vector ($\vec{\phi}$) 211. This resolution is done by processing measurements by an ambiguity resolver 209 across the multiple baselines. An error in determining $n_i$ on any baseline invalidates the subsequent relation between the resolved phase vector ($\vec{\phi}$) and DOA unit vector ($\vec{u}$) 212, throwing off the subsequent estimate of AOA 206 by a large amount. Hence it is called a gross error.

In doing the processing as indicated by reference numeral 209 of FIG. 2, Malloy obtains a uniform gross error rate across the frequency band of interest independent of the emitter relative bearing by only allowing antennas placed at relatively prime integer multiples of a fundamental spacing ($d_o$). He calls the discrete set of candidate points the array lattice. FIG. 3 of subject applicant's drawings illustrates a simple linear three antenna array designed according to Malloy's approach. In this figure 300 is the array lattice, and the antennas 301 have relative integer spacings 3 and 4 times the lattice spacing ($d_o$) 302. The lattice spacing is determined by the wavelength 304 at the highest frequency and the FOV constraint 303.

The fixed value of the gross error rate across frequency and AOA is a most desirable property. A further significant advantage of using Malloy's placement restrictions and his design method is they result in arrays maximizing the AOA or DOA accuracy while minimizing the gross error rate. Also, critical for satellite applications, his method does this using the minimum possible number of antennas.

Malloy's approach thus produces the best sparse element interferometer, optimal in the sense, that, for a given Gaussian phase error vector ($\vec{\epsilon}$) as indicated by reference number 214 with covariance matrix R, the quadratic cost L which can be expressed as:

$$L = \left(\vec{\phi} - \frac{2\pi}{\lambda}D\vec{u} + 2\pi\vec{m}\right)^T R^{-1} \left(\vec{\phi} - \frac{2\pi}{\lambda}D\vec{u} + 2\pi\vec{m}\right) \quad (1)$$

is minimized. D in equation (1) is the matrix of baseline vectors 216 shown in FIG. 2, where ($\vec{k}$) 217 is the unit vector along the antenna phase centers and ($\vec{u}$) the DOA unit vector 212. For planar arrays as shown in FIG. 5 of this set of drawing figures and discussed hereinafter, (D) is the matrix 506 of baseline vectors ($\vec{d}_i$) 508 forming the array. Planar arrays are used when DOA rather than AOA is required. Interferometers designed according to Malloy's method are thus ideal for satellite applications.

None the less, utilizing a simple array as shown in FIG. 3 of the set of drawing figures disclosed herein, or an equivalent with four antennas as taught by the satellite telecommunications system of Aubain (U.S. Pat. No. 6,417,799) presumably could be used, especially since in the Aubain approach the detection satellite could be dedicated to the emitter location problem and hence ab initio designed to support an optimal multi-antenna element linear array. But signal jamming is not just a problem for GEO telecommunication satellites. LEO communication satellites are also important. For example, U.S. Pat. No. 5,412,388, "Position Ambiguity Resolution", Attwood, discloses an LEO communications satellites support radio telecommunications system operating with portable units. Portability requires low power battery operation, and small antennas. Such units can communicate with satellites in LEO orbits, but not GEO satellites 30× farther out.

Aubain's multi-satellite technique does not adapt well to locating LEO jammers. For example, reversing the roles of the low earth orbit and geosynchronous satellites will not work because of the GEO detection difficulty Nor does using two LEO satellites work since simultaneous emitter detection is a significant problem in low earth orbit. It is a problem both because of weak signals, where one of the LEO satellites is far from the transmitter, and because the emitter may not be visible to all antennas in the detection satellite's array.

Coordination is a further major problem. This is a difficulty for any multiple LEO satellite scheme, not just one based on Aubain's approach. Even when all the satellites detect the interfering signal, some central controller and processor must recognize that a jammer was detected, collect data of the same jammer signal from all the satellites, and then derive a geolocation estimate. To satisfy this need Aubain suggests downlinking and processing the data at a ground station. This is a satisfactory solution in Aubain's original scenario because of the presence of a geostationary telecommunications satellite and such a satellite can always have a ground station visible. But with only LEO satellites, it is much too restrictive to assume a ground station with the required processing facilities will be visible to any of the satellites let alone all when the jammer transmits.

Because of these detection and coordination problems, the most robust operational approach to LEO geolocation of interfering emitters is to use a single satellite. Further, that satellite must be the one experiencing jamming, and must be able to autonomously derive the jammer location from onboard measurements. Attwood solved the emitter location problem with a single LEO satellite by making sequential time delay and frequency change measurements, but suggested synchronizing the frequency base and time base used by the satellite and transmitter to achieve the required signal stability. Jammers, however, are not so helpful. Because the jamming transmitter will not generally cooperate by providing signal stability, allowing the use of delta-Doppler, location must be derived solely from angle of arrival (AOA) or direction of arrival (DOA). AOA is adequate in Aubian's approach because it is used with time difference of arrival (TDOA) or frequency Doppler difference (FDOP). But when only angle measurements are available, DOA is far superior to AOA since it results in an actual emitter location estimate at each receiver dwell, rather than just the line-of-position on which the transmitter lies. Also, the transmitter may be on only briefly. Accordingly, using DOA greatly expedites the location process.

Attempts have previously been made to measure DOA with a single antenna, and thus avoid the need for phase measurements across a two dimensional interferometer array. For example, U.S. Pat. No. 6,583,755, "Method and Apparatus for Locating a Terrestrial Transmitter from a Satellite", Martinerie and Bassaler, discloses the concept of performing single platform LEO geolocation by measuring a plane the emitter's DOA vector lies in, called the propagation vector. However, it uses a single special antenna to make this measurement. The plane intersects the earth, resulting in a circle of position. The DOA plane is derived from measurements of the electromagnetic field's polarization, with the polarization being restricted to linear polarization. Unfortunately the restriction to one special type of electromagnetic wave polarization greatly limits the method's usefulness. Jamming signals are not restricted in their polarization.

Accordingly, there is currently no robust way to perform single satellite geolocation other than by measuring DOA by implementing a multielement antenna array equivalent to a planar interferometer. And in particular, if a conventional planar array is chosen, an approach such as presented by Malloy appears to be the best available. As noted, such an array will generate the best DOA accuracy for the lowest gross error rate utilizing the minimum number of antennas. The antennas may be chosen to cover the frequency band of interest and respond to any transmitted polarization. Such an array, if large enough, could accurately locate emitters in a single receiver dwell by intersecting the DOA vector with the earth's surface. This method is called Az/El geolocation. However, the baselines for such an array are comparatively large and they typically are measured in meters rather than conventional centimeters.

Hence implementing such an array generally requires specifically designing the satellite to support it, possibly using such specialized structures as that described in U.S. Pat. No. 6,016,999, "Spacecraft Platforms" by Simpson, McCaughey and Hall. Therefore, for the widest possible application, especially on existing satellite designs, smaller arrays must be considered. Such arrays, however, do not support Az/El geolocation, but do support locating emitters using some form of triangulation or bearings-only geolocation over several dwells as the satellite moves in its orbit.

An example of such an array using Malloy's design approach is shown in FIG. 4 of this specification. The points 400 of FIG. 4 represent a lattice of antenna spacings for an optimal planar array analogous to the antenna spacings 300 in FIG. 3 for the linear array. The points are now located by two fundamental lattice position vectors ($\vec{d}_1$) and ($\vec{d}_2$) shown by reference numeral 40. At least nine (9) antennas 402 are typically required to provide a small gross error rate while providing DOA performance supporting bearings-only geolocation. The optimal array is designed by arranging the nine antennas on the lattice points in different configurations consistent with the relatively prime integer-multiple requirement and computing the quadratic cost (Equation 1) for each arrangement. Just as for the linear array, utilizing these lattice points and prime integer spacings guarantees an array having a gross error rate independent of frequency and signal angle of arrival. The configuration chosen would be one minimizing the cost while giving the required DOA accuracy with the lowest gross error rate. The configuration shown in FIG. 4 is illustrative of how such a final design would look.

The array 500 shown in FIG. 5A is a more pictorial representation showing its implementation with a two channel receiver. By intersecting the AOA cones in a DOA processor 501 across multiple antenna pairs, a unique DOA unit vector ($\vec{u}$) 502 is found. The DOA unit vector 502 is also shown relative to the array 500.

Note that because of the phase measurement error vector ($\vec{\epsilon}$) 503 the DOA unit vector ($\vec{u}$) 502 has an error cone 505 associated with it. This is usually taken to represent a 3σ error deviation, so the true DOA lies within this cone 98.9% of the time. Because of this error the range line 506 shown in FIG. 5B extending the DOA 52 to the earth's surface, thus providing a slant range to the emitter, does not usually intersect the earth at the emitter's true location. Rather a somewhat elliptical boundary 507 is formed by the cone 505, shown in FIG. 5A, and the emitter lies within this boundary all but about 1% of the time.

When the emitter lies near the satellite's suborbital point, the boundary closely approximates an ellipse 600 shown in FIG. 6A. But as emitters approach the satellite's horizon, the boundary becomes more distorted, larger and egg shaped as shown by reference numeral 601. The increase in the area is due to the interaction of the earth's curvature 602 shown in FIG. 6B with the DOA error cone 603. The earth's curvature 603 increases the range uncertainty to the emitter. Thus the slant range error 605 is significantly larger away from the suborbital point 604 compared with the error 606 for transmitters closer in.

The error cone 603, and hence slant range errors 605 and 606 are reduced by extending the outermost interferometer baseline spacings. So accurately locating any emitter within the satellite's field of view, particularly those near its horizon, requires increasing the outer antenna spacing in the array 500 shown in FIG. 5A to the maximum extent possible. But improving DOA accuracy introduces larger phase measurement ambiguities 507, and hence requires more antennas to resolve them. The nine (9) antennas shown in FIG. 5A may thus actually represent a lower bound for the number required in a planar interferometer array supporting LEO bearings-only location for emitters far from the suborbital point.

Hence even implementing an optimal interferometer with the minimal number of elements to solve the LEO location problem still generates what is derisively called by the satellite community an "antenna farm." Accordingly, this solution is normally not practical or desirable to implement because of the space required on the satellite's surface. The space required is not the only restriction, however. Each antenna must have its own unobstructed field of view. This greatly limits what else can be installed. Therefore, implementing even a small array usually requires that the satellite still be specifically designed to support it.

This is generally unacceptable since locating interfering emitters would be an auxiliary task, not the primary mission of most LEO satellites. So the array for locating an interfering transmitter must fit into an existing design, and not require a new one. The only way the array in FIG. 5A, for example, repeated in FIG. 7 by reference numeral 700, can fit onto an existing design is by eliminating antennas. If only three antennas are retained, such as shown by reference numeral 701 in FIG. 7B, the array has a much better chance of being acceptable. It will achieve the DOA accuracy required. But now, because of the phase measurement ambiguities 704, spurious DOAs 705 are produced, one possible DOA for each integer pair (n, m) 706. The ambiguous DOA vectors 702 each have an associated error cone 703.

This, of course, results in ambiguous emitter locations as shown in FIG. 8B, where for clarity an array 800 identical to array 701 shown in FIG. 7B is reproduced. In FIG. 8B, reference numeral 801 represents the range vector ($\vec{r}$) extended along the true DOA to an actual emitter location, while range vector 802 and the other range vectors indicate spurious locations. Note that even though the DOA associated with range line 802 is spurious, its error region 803 is formed by the associated error cone intersecting the earth's surface, just as for the true emitter.

Since the reduced array size requires relative motion to locate the emitter, it is natural to ask if the ambiguous sites may be eliminated by the same satellite movement. A technique for exploiting platform motion to resolve phase measurement ambiguities does exist for the two element array shown in FIG. 1. In U.S. Pat. No. 3,935,574, "Signal Source Position-Determining Process", Pentheroudakis discloses a method utilizing either rotational motion or translational motion of a two element ambiguous horizontal interferometer to pick the correct sequence of AOA cones over a series of receiver dwells and hence eventually resolve the linear array.

At the first dwell Pentheroudakis establishes the set of possible ambiguity integers ($n_i$) and uses each integer from this set to produce a candidate resolved phase. The phase rate is then measured and the phase roll over is tracked or changed in each integer $n_i$ as the array moves relative to the emitter.

Under this phase unwrapping procedure, the correctly updated ambiguity integer sequence produces a stable location estimate that converges to the true emitter position. The other sequences eventually produce AOA that exhibit abrupt changes when the respective ambiguity integer gets incremented, causing the corresponding location estimates to diverge and hence eliminating those integer sequences as viable candidates.

Pentheroudakis' method requires almost continuous phase measurement updates to track the phase change and hence the integer roll over for each integer set or lobe. Although used to resolve a single two element interferometer, the method could be readily adapted to the three element planar array 800 shown in FIG. 8A. Now the roll over in two sets of ambiguity integers ($n_i, m_i$) must be tracked. This greatly extends and complicates the software processing required, but does not alter the basic method of using phase tracking to update the ambiguity integers ($n_i, m_i$), and then updating the candidate emitter locations.

A more significant drawback when trying to adapt the method to satellite applications is the extent of both the true and spurious error regions, e.g., regions 803 shown in FIG. 8B, especially for candidate emitter locations 804 relatively far from the suborbital point of range line 802. Also important is the fact the error regions for the ambiguous locations can overlap each other as shown by reference numeral 805.

The extent and overlap of the error regions 805 both have critical consequences. Reference will now be made to FIG. 8C. First assume that region 815 is a true site. As the satellite moves in its orbit from position 806 to 807, the spurious location 809 associated with DOA 808 may jump to new location 810 in a more erratic manner than estimates for the true site even before an incorrect integer roll over occurs. But this somewhat erratic movement is difficult or even impossible to detect with Pentheroudakis' method because of the extent of the error region 816. Further, the abrupt DOA jumps caused when phase tracking generates incorrect integer updates are a function of the measured phase change created by the true emitter DOA's movement relative to the interferometer baseline. This has a significant impact on ambiguity resolution performance.

To understand this impact, assume now that the true emitter happens to lie far from the suborbital point, for example at point 811 rather than point 815. Now a comparatively large satellite orbital translation and hence significant time is required to create enough true DOA change to trigger integer updates and thus cause eventual large abrupt jumps in the spurious DOA occur at other distant sites such as site 809. When such jumps occur, because of the overlap of error regions these jumps may not eliminate wrong locations. For example, if suborbital point 811 is the true emitter location and it occurs in an overlap region 812, it cannot be easily statistically differentiated from spurious site 813. Even a phase roll-over may not clearly differentiate the two. It should be noted that there can be a significant number of these overlap regions, particularly at higher frequencies.

Another critical problem adapting Pentheroudakis' method to satellite based emitter location is the requirement for almost continuous sampling of the phase measurement. For the planar array 800 shown in FIG. 8A, the receivers for the two channels shown must switch via switch 814 between baselines to do the phase sampling, so there is a limit to the sample rate. But the most fundamental problem with continuous phase tracking is that the noncooperative emitter might not be transmitting or detected at each receiver dwell during the geolocation process. For example, a simple way to defeat the Pentheroudakis scheme is to blink the emitter with a duty cycle that still interferes with satellite communication, but does not allow unwrapping of the candidate phases. Also, as noted before, on a satellite all antennas in the array may not have the same unrestricted field of view. So even with the emitter continuously transmitting, satellite attitude may prevent phase measurements during a significant number of the receiver dwells.

The present invention overcomes the inherent problems associated with applying the Aubain, Attwood, Martinerie, and Pentheroudakis approaches to locating an emitter interfering with a satellite in low earth orbit (LEO). In particular, both cooperative and non-cooperative emitters are located with equal facility. The present invention does not require an emitter to transmit continuously, or require the transmitter to have special stability or polarization characteristics. It does not require downlinking data to a ground station. It does not require simultaneous detection of the emitter by multiple satellites, although it can be incorporated in such methods to increase their versatility.

The present invention is directed to an intrinsically low earth orbit technique that exploits the excellent DOA measurement capability of planar interferometer arrays. It can employ arrays designed using Malloy's optimal approach, but with the array not fully populated with antenna elements and hence producing ambiguous DOAs. If this is done special processing utilizing the antenna's relatively prime integer spacing in an array lattice can be incorporated, but this concept is not pursued in the present invention since it is not essential. Further, it is not an intrinsic requirement of the invention that the antenna element placement satisfy the Malloy, Dybdal and Rousseau or Cai restrictions. Their placement can be arbitrary, dictated by space available on the satellite. In fact the antenna spacing in the subject invention can vary from one measurement update to another and thus the interferometer array can be flexible or floating.

In performing geolocation, the present invention uses a minimal number of antennas required to generate ambiguous emitter DOAs. If no satellite attitude change is allowed during a receiver dwell the minimal number is three. But if some restricted attitude change is feasible, a modification to the method described in the present inventor's U.S. Pat. No. 5,457,466 "Emitter Azimuth and Elevation Direction Finding Using Only Linear Interferometer Arrays" permits the use of only two antennas. Also only two antennas may be required, if not coboresited, when incorporating the method described in the inventor's U.S. Pat. No. 5,608,411 "Apparatus for Measuring a Spatial Angle to an Emitter Using Squinted Antennas."

The present invention does not generate a candidate ambiguity integer set at each receiver dwell by phase tracking. Thus maintaining a continuous common field of view for all the antennas is not a requirement. Gaps of many seconds can occur between phase updates. Instead of lobe tracking or phase unwrapping, the present invention uses the initial emitter locations obtained from the initial set of ambiguous DOA to predict ambiguity integers during the satellite's subsequent orbital motion. In other words, this invention does not use phase to predict location, but rather location to predict phase.

SUMMARY OF THE INVENTION

Accordingly, it is an object of this invention to initially determine all possible emitter sites of an emitter from ambiguous phase measurements made in the first receiver location processing dwell, and then to use these estimated sites to resolve the phase measurements made in subsequent dwells.

It is a further object of the invention to input the corresponding resolved phase to a location estimator for each site, and hence update the site's geolocation estimate based on the phase resolved by that site.

The present invention thus effects both a feed forward process where the resolved phases drive the corresponding emitter locations, and a feed-back process where the updated emitter locations generate the cycle integers required to resolve the next set of measured phases.

Another object of the invention is to assign a probability or likelihood to each individual site's location estimate based on the feed-forward and feed-back processing.

Still another object of the invention is to use these probabilities for estimating an actual emitter location without necessarily determining which site correctly predicts the ambiguity resolution.

These and other objects are achieved by the subject invention which associates both a location estimation and location probability determination process with each possible emitter site and its corresponding error region, and uses both feed-back and feed forward interaction between the location and phase ambiguity resolution processes to generate resolved phase from emitter location, update emitter location, and, subsequently, utilizing the probabilities, producing a single estimate of an emitter's location.

BRIEF DESCRIPTION OF THE DRAWINGS

The present invention will become more fully understood from the detailed description given hereinbelow and the accompanying drawings, which are provided by way of illustration only, and thus are not meant to be considered in a limiting sense of the present invention, and wherein:

FIGS. 11A-11D are a set of bar graphs illustrative of the evolution of the location probabilities for an emitter located in relation to an initial satellite suborbital point, where these probabilities are used to show that the weighted average location estimate is generally superior to the maximum probability estimate before the array is resolved.

DETAILED DESCRIPTION OF THE INVENTION

Figure 8B:
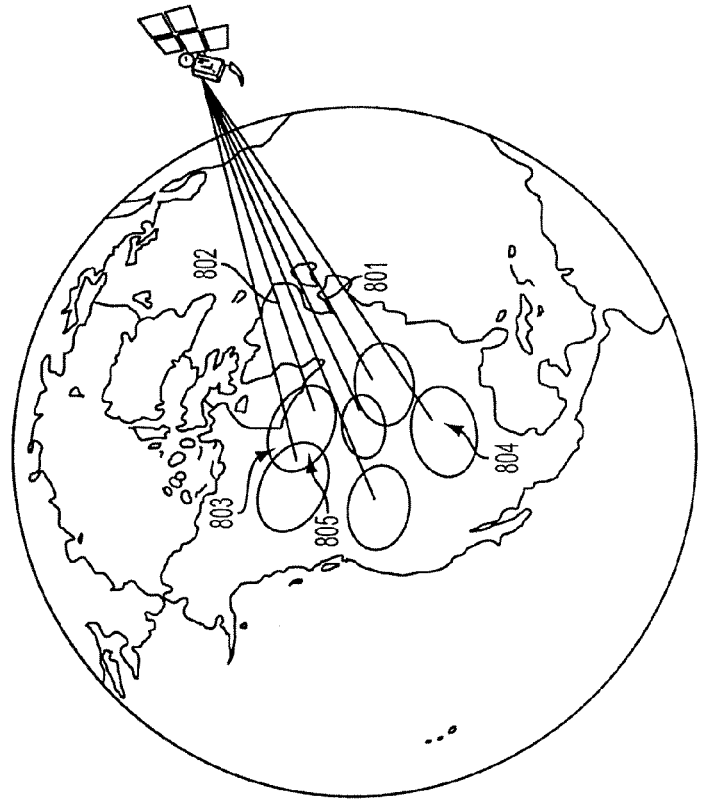
FIGS. 8A and 8B show how the error cones associated with the ambiguous direction of arrival vectors for a three element array shown in FIG. 7B can create a pattern of large and overlapping error regions where they intersect the earth.
Figure 8A:
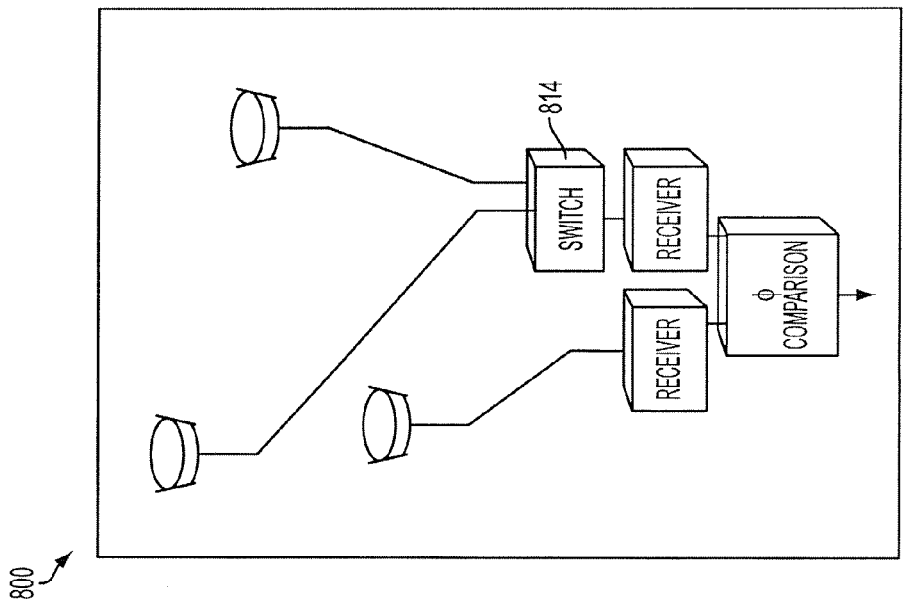
Figure 9:
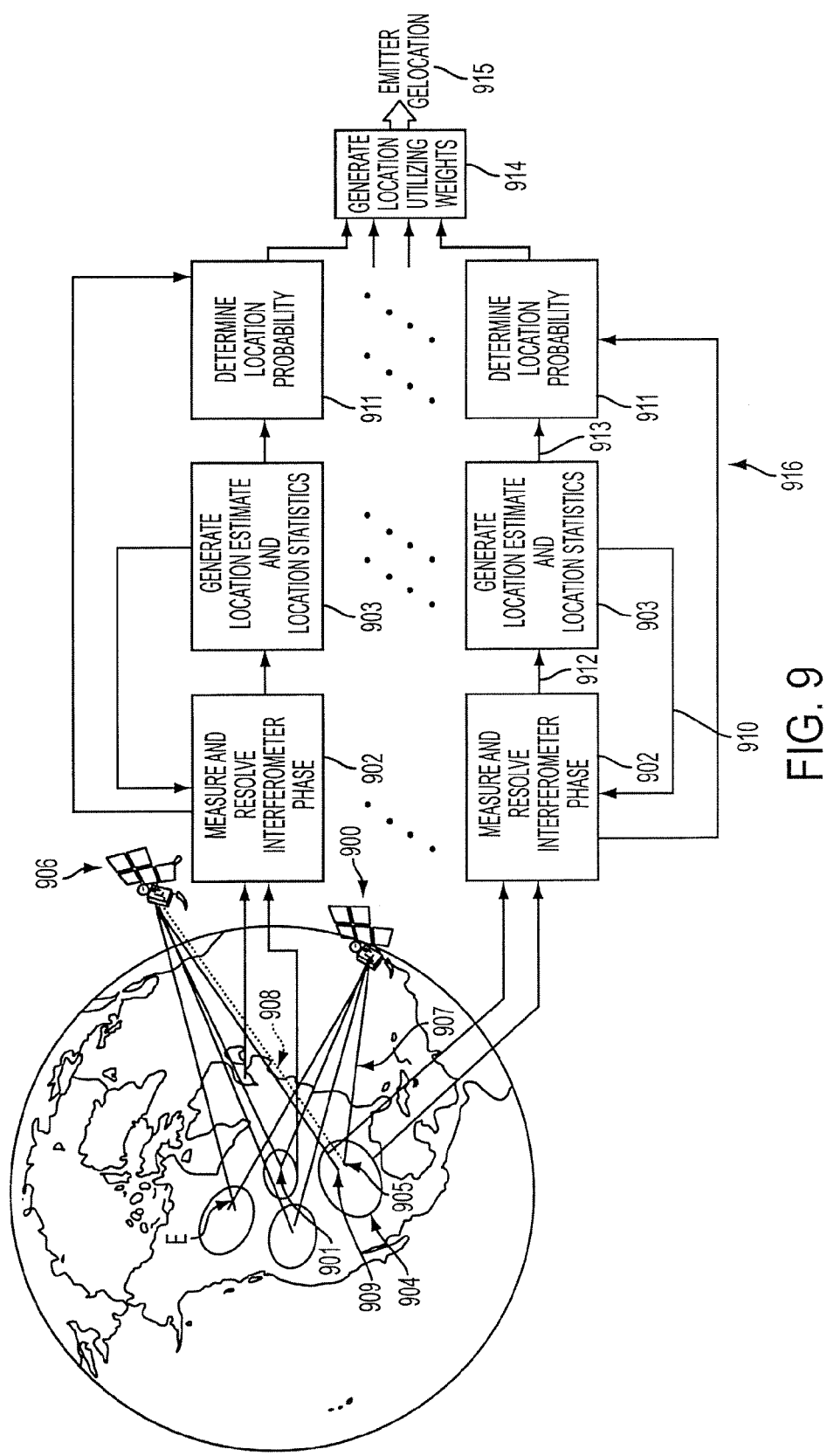
FIG. 9 is a top level block diagram generally illustrative of the operation of the subject invention.
Figure 10:
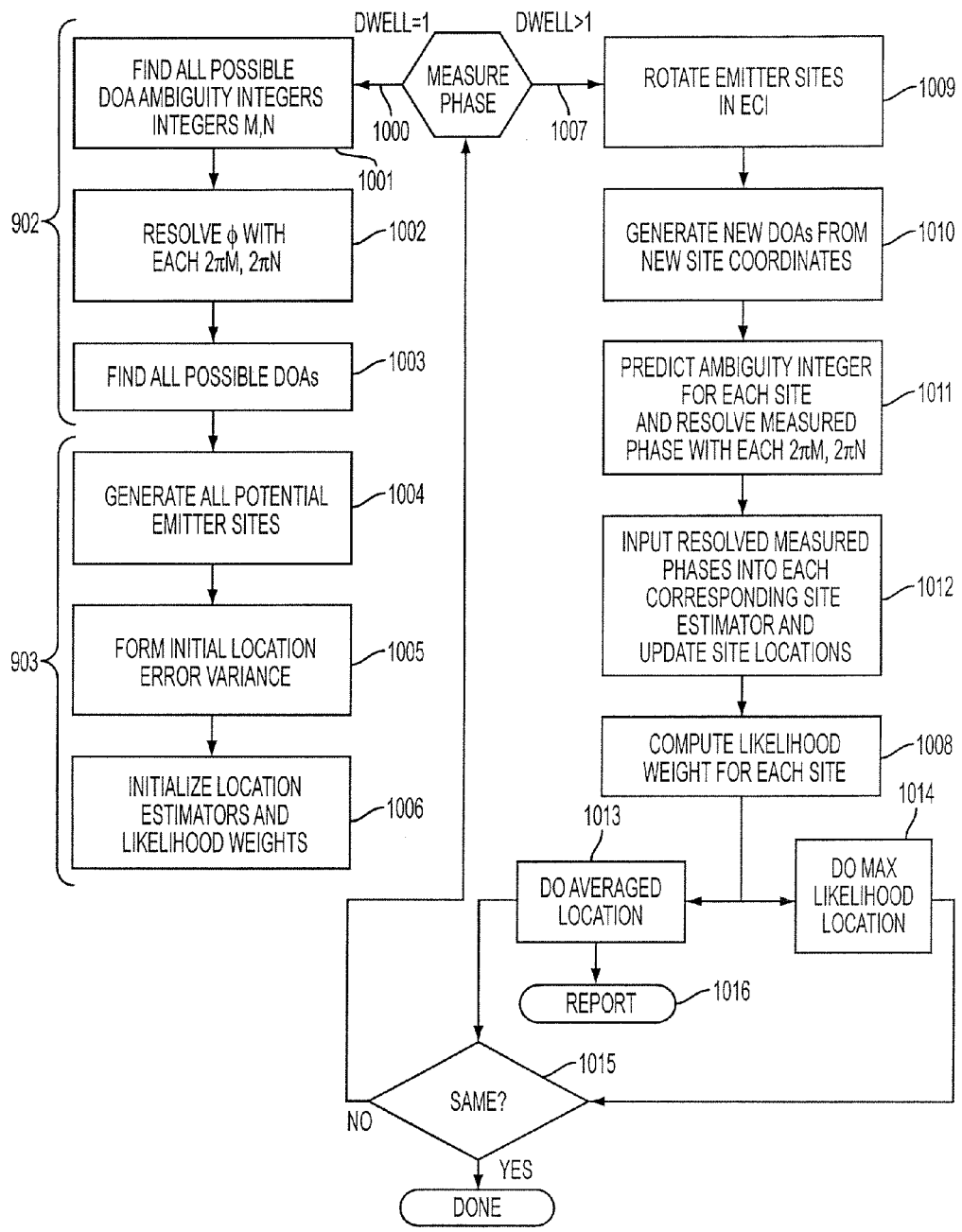
FIG. 10 is a flow chart illustrative of the method of this invention, shown in FIG. 9 and providing details of the processing carried out.

Referring now to the top level method block diagram in FIG. 9 and corresponding flow chart of FIG. 10, the following description is made first with reference to a three element array such as shown, for example, in FIG. 8A by reference numeral 800 which includes two interferometer baselines. A satellite at location 900 including a three element array 800 initially detects an emitter E whose true location is at location 901 shown in FIG. 9.

Upon initial detection, a set of steps in a Measure and Resolve Interferometer Phase processes 902 and a set of steps in a Generate Location Estimate and Location Statistics processes 903 are carried out. Special operations involving steps 902 and 903 of FIG. 9 unique to a first dwell step occur as shown in FIG. 10 by reference numeral 1000. All possible direction of arrival (DOA) vector ambiguity integer pairs (m, n) are found in step 1001 and each pair is associated with a unique Measure and Resolve Interferometer Phase process 902. The measured phase of step 902 is resolved with an associated integer set (m, n) in step 1002 of FIG. 10.

Next, all candidate DOA vectors 907 of an emitter E are computed per step 1003 from each resolved phase, along with estimates of their location error variance, and are used for a corresponding Generate Location Estimate process 903. Each step of the Generate Location process 903 determines an emitter site per step 1004 for its associated DOA using Az/El ranging. This is the only time Az/El geolocation is used.

Based on the DOA error variance input from process 902, a location error variance for each site is computed in step 1005 of FIG. 10. This equivalently produces an error bound 904 for each estimated position 905 shown in FIG. 9.

The error variances and location estimates generated initialize a corresponding set of recursive location estimators per step 1006 in FIG. 10 that are used in subsequent dwell times 1007. The likelihood weight computation of step 1006 is also initialized and carried out in the Determine Location Probability process 911 (FIG. 9). A weight is assigned to each site per step 1008, and represents the probability the site is the correct one.

For the initial dwell time 1000 (FIG. 10), the default is all sites equiprobable, so each site is given a likelihood inverse to the number of DOA vectors 907. However, a priori knowledge of the emitter location can be incorporated in initializing the probabilities. Thus if certain regions 904 are deemed more probable, or are of heightened interest the weight initialization per step 914 can be adjusted. This adjustment will influence the emitter geolocation estimates 915 made from the first few subsequent phase measurements in successive dwell steps 1007 shown in FIG. 10. If accurate, it will accelerate convergence to the true emitter location. If wrong it will delay convergence, but not prevent it since after a transient the weight calculation forgets the initialization and depends only on current measurements and the processing of each individual estimator initialized in step 1006. That the weights generated in Location Probability process 911 are a product of individual estimator processing step 1006 occurring in each associated member of the Location Estimation process 903 and not a driver of the processing or fed back to the processing is a fundamental aspect of the invention.

After the satellite moves in its orbit to location 906, a second receiver dwell time 1007 (FIG. 10) occurs. The phase measurements are now again made in accordance with the process steps 902 and 903 to determine location probability 911. A number of different coordinate systems may be used in making and processing the measurements to eventually generate the emitter location 915. The use of no one particular system is essential to the invention, however, it has been found most convenient to use the well known earth centered inertial (ECI) coordinate system for storing the candidate emitter locations. Thus the emitter positions from the previous dwell are updated per step 1009 of FIG. 10 to account for the earth's rotation between the dwells.

After the satellite moves in its orbit 906, a second receiver dwell occurs and the Process 902 is now repeated. Also in Process 902 new DOA vectors are generated for each site but in a way completely different than the method used in the first dwell time 1000. Now DOA vectors are generated per step 1010 using each position vector from the site coordinates updated in step 1009 to the current satellite position 906 shown in FIG. 9. An example is a range vector 908 derived from previous estimated site 905. This vector is normalized to produce a predicted DOA vector. A new ambiguity integer pair (m, n) is generated per step 1011 by forming the vector scalar product of the predicted DOA and each of the interferometer baselines.

The measured phase pair is then resolved and the resolved phase is applied to an input to each corresponding location estimator process 903. The site estimate is updated per step 1012 using a recursive filter and a new estimated site 909 (FIG. 9) is generated. This estimated site differs from site 905 even though previous estimated site 905 was used to resolve the phase measurement ambiguity. Predicting the correct phase ambiguity integer does not require a close match between the predicted and resolved measured phase, and in fact even for the true site 901 the two typically are significantly offset. This aspect is an intrinsic element of the subject invention. The change in estimated position to emitter site 909 from site 905 reflects the difference.

Thus the previous site estimates for an emitter E combined with the satellite position at the time of the phase measurements drive the ambiguity integer prediction. Hence the current phase measurement is resolved based on the previous location estimate, and this resolved phase drives the Probability Location Determination process 912 for each new emitter location update. This is a feed forward process from the old site estimate to the new one. The new site estimate is then returned per step 910 to the Measure and Resolve Phase process step 902 to predict the next ambiguity integer set. This is a feed back process from the current location estimate to the ambiguity resolution of the next phase input. The interaction of this feed-forward and feed-back process is a central aspect to the present invention.

Note that because there is no phase tracking or need to follow integer roll-overs the measurement updates can be irregular and spaced far apart in time. In fact theoretically only two updates are required. But, to increase the accuracy of the probability determination 911, more updates than this minimum are desirable.

Also of particular note is the fact that Process 911 determines the emitter site probabilities by comparing results from the feed-forward and feedback processing. As part of the location estimation process in 903, error variances are produced for the prior site update range vector 908. These error variances are input 913 and used to bound the difference between the measured resolved phase 916 and the phase predicted by 908. The signal to noise ratio (SNR) associated with the actual phase measurement is used in the bound and a probability then assigned to the site based on the statistical closeness of the predicted and measured phases.

As noted there is no feedback from the probability estimation process 911 to the location process 903 or ambiguity resolution process 902. Nor is there any cross processing in 1008 (FIG. 10) determining the probability involving the other sites. After the probabilities are updated per step 1012, Process 914 generates a unique emitter position estimate. There are two ways to do this: (a) weight each estimate with its probability and form a weighted average per step 1013; or, (b) pick the single emitter site having the highest probability per step 1014. If enough receiver dwells are made, it is not critical which method is used since both will eventually converge to the same answer. In fact, convergence is defined to occur when it is determined both location estimates are the same to within statistical error at step 1015.

However, if the overlaps persist dwell to dwell, this set tends to be clustered around the true emitter position, so the weighted average provides an accurate estimate. Thus it is the weighted average that is reported after each update in step 1016. Hence a significant improvement is provided in that an accurate emitter estimate can be provided without determining the correct DOA. i.e., the emitter E is located without completely resolving the array.

Reference to the graphs shown in FIGS. 11A-11D illustrates this important behavior and shows the probability evolution for a 6 GHz emitter, for example, located 926 km from the satellite suborbital point. In this simulation phase measurements were made on a three element equilateral array with 45.7 cm baselines and 5 second updates. The phase error on each measurement had a 1σ value of 15 electrical degrees (edeg). Initially 38 of the array ambiguity integer pairs (m, n) produced DOAs intersecting the earth's surface. After three further updates, spaced five seconds apart, as shown in FIGS. 11B, 11C and 11D, the sites numbered 23, 25 and 31 in FIG. 11D all had significant probabilities. Note that the numbering of the sites does not necessarily indicate geographical closeness, but in this case all three sites were clustered comparatively close together. The weighted average over all the sites using the probabilities shown at a 15 second update produced an error of 8.6 km.

This example was with a comparatively small array. Extending the baseline lengths or reducing the phase error would reduce the location error proportionally, as will now be shown in the following description of the preferred embodiment of the invention.

DESCRIPTION OF PREFERRED EMBODIMENT

Figure 12:
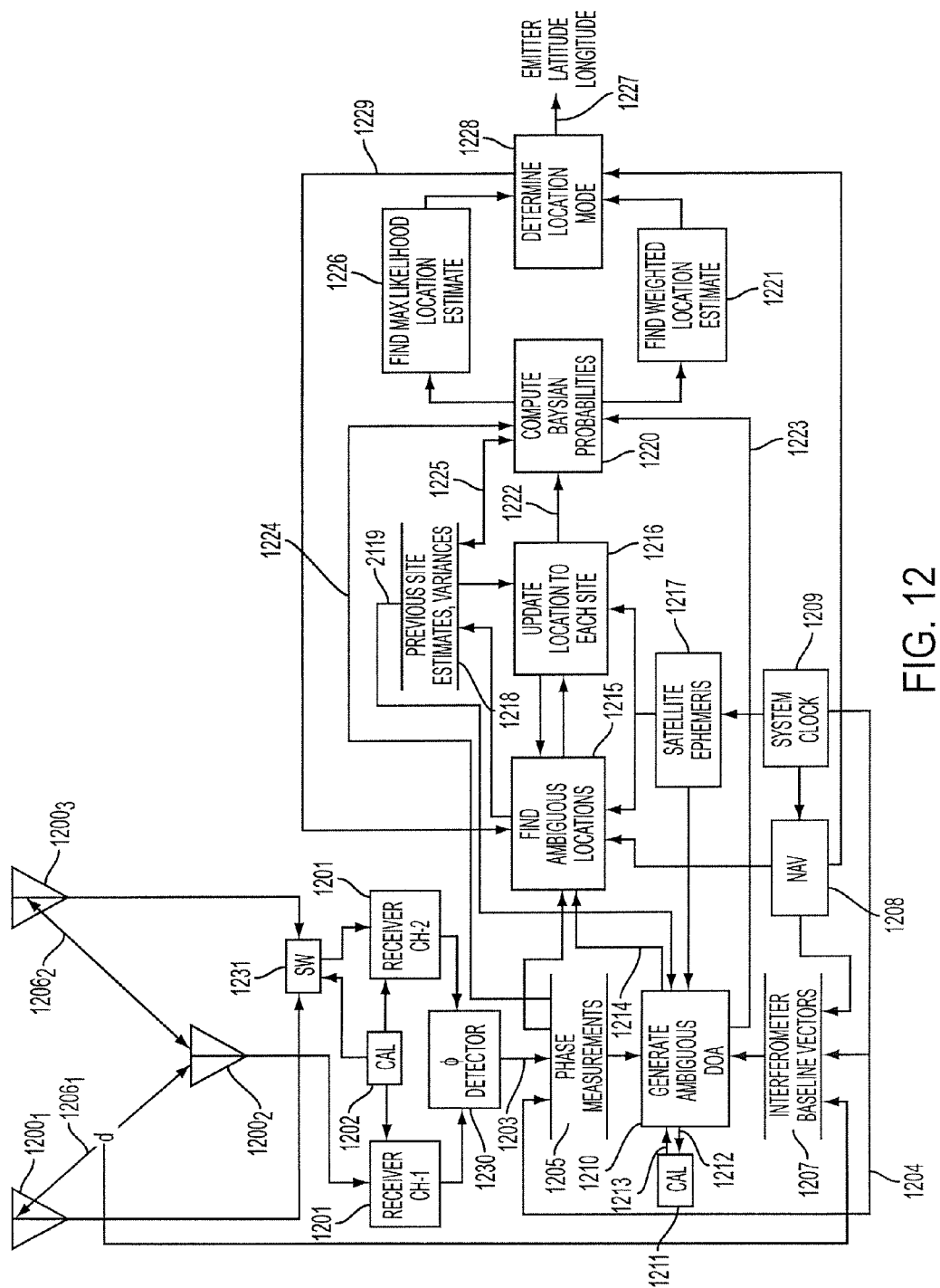
FIG. 12 is a detailed block diagram showing the preferred embodiment of the subject invention.

Referring now to FIG. 12, shown thereat is a detailed block of the preferred embodiment of the subject invention. Antennas 1200$_1$, 1200$_2$ and 1200$_3$ are chosen to be responsive to a wide range of emitter polarizations across all frequencies of interest. Generally circularly polarized antennas are preferred because they are also responsive to linear and elliptical wave polarizations. However, such antennas are either left (L) or right (R) circularly polarized (CP). Typically one type of CP predominates in the emitters of interest, so this restriction is not a problem. But if it is, then baselines formed from both left (LCP) and right (RCP) antennas can be used. Since the dual polarization antennas are essentially colocated this will not usually create an installation difficulty. Switching between the antenna pairs, however, increases the time required to cycle through the band and update phase measurements. But the present invention supports an extended and irregular time between dwells, so this is not a problem.

If dual polarization LCP and RCP antennas are required there is a way to generate the ambiguous DOA using only two antennas that are not co-boresited. This method, as previously noted, is described in U.S. Pat. No. 5,608,411, "Apparatus for Measuring a Spatial Angle to an Emitter Using Squinted Antennas" issued to the present inventor on Mar. 4, 1997. Implementing such an arrangement does not require special satellite attitude changes, and so is consistent with the operation of the subject invention, which is to use only translational motion to geolocate. Such a specialized implementation will not be pursued here. Instead three antennas $1200_1$, $1200_2$ and $1200_3$ as shown in FIG. 12 form two interferometer baselines $1206_1$ and $1206_2$. If the three antennas $1200_1$, $1202_2$ and $1203_3$ are placed at the vertices of an equilateral triangle as shown in FIG. 12, the array symmetry provides robust performance.

A tolerance of extended and irregular phase measurement sample times is provided by the subject invention. Accordingly, a two channel receiver 1201 is used to make phase measurements in a single phase detector 1199. This saves weight, power and cost. Switch 1231 determines the baseline $1206_1$ or $1206_2$ across which phase is measured. To obtain emitter DOA, phase must be measured across both baselines in a single receiver dwell. Calibrating out the phase mistrack between the channels $CH_1$ and $CH_2$ is essential. The phase mistrack between the two channels depends on emitter frequency, phase amplitude and ambient temperature. To reduce this mistrack error a calibration signal is injected via a CAL circuit 1202, and the result of this calibration essentially provides a residual error having a fixed component no more than 5 edeg and varying part no more than 1.5 edeg.

Phase measurements outputted from the phase detector 1230 on data line 1203 are time tagged via timing signals from a system check 1209 on clock signal line 1204 and stored in a memory 1205. Interferometer baseline vectors of the baselines $1206_1$ and $1206_2$ at the phase measurement times are also stored in a memory 1207, where they are transformed from sensor to ECI coordinates using onboard navigation measurements from the NAV system 1208. Time tags are provided by the precision system clock 1209 by way of clock signal line 1204. This clock provides the equivalent of Universal Time or so called UT1 time since inaccuracies in the clock create effectively larger phase measurement errors.

Using the stored phase measurements and baseline vectors from memories 1205 and 1207, a set of all possible DOAs is generated in process step 1003 (FIG. 10) by ambiguous DOA signal generator 1210. First the field of view (FOV) limits are established by finding the maximum emitter-to-satellite angle at the satellite. Then the ambiguity integer pairs (m, n) are found. This can be done by simply moduloing down d/λ, i.e. the ratio of baseline length to signal wave length. Doing this for both baselines and then forming the direct product of the two integer sets gives all possible integer pairs (m, n). The measured phase vector is resolved with each integer pair, and the corresponding DOA found. If the DOA is within the field of view limits it is retained, otherwise discarded. Special test are needed for DOA not intersecting the earth near the horizon to assure valid DOA are not eliminated because of measurement noise.

The adjustment for emitters at the horizon takes place after correcting the resolved phase with antenna calibration data from a calibration table circuit 1211. Calibration is used to reduce the fixed bias part of the antenna mistrack error. The antenna errors are DOA dependent, and so a different correction is provided for each hypothesized emitter position. The initial DOA estimate for an uncalibrated phase on signal line 1212 from the ambiguous DOA generator 1210 is used to find the DOA dependent error correction signal in signal line 1213 in the database. This is added to the resolved phase and the DOA recomputed in the ambiguous DOA generator 1210. This iterative method is accurate enough to reduce the fixed error to about 0.5 edeg. Multipath from scatter off the satellite and refractive effects can be accounted for in this manner, as well as radome errors. But because the initial DOA input to the calibration table circuit 1211 table is not corrected the variable part of the error is still fairly large, about 2 edeg. However, since the process is dwell-to-dwell random, the impact can be substantially reduced in the recursive estimation that occurs in a signal filter 1216 which provides an update location to each site.

Figure 8C:
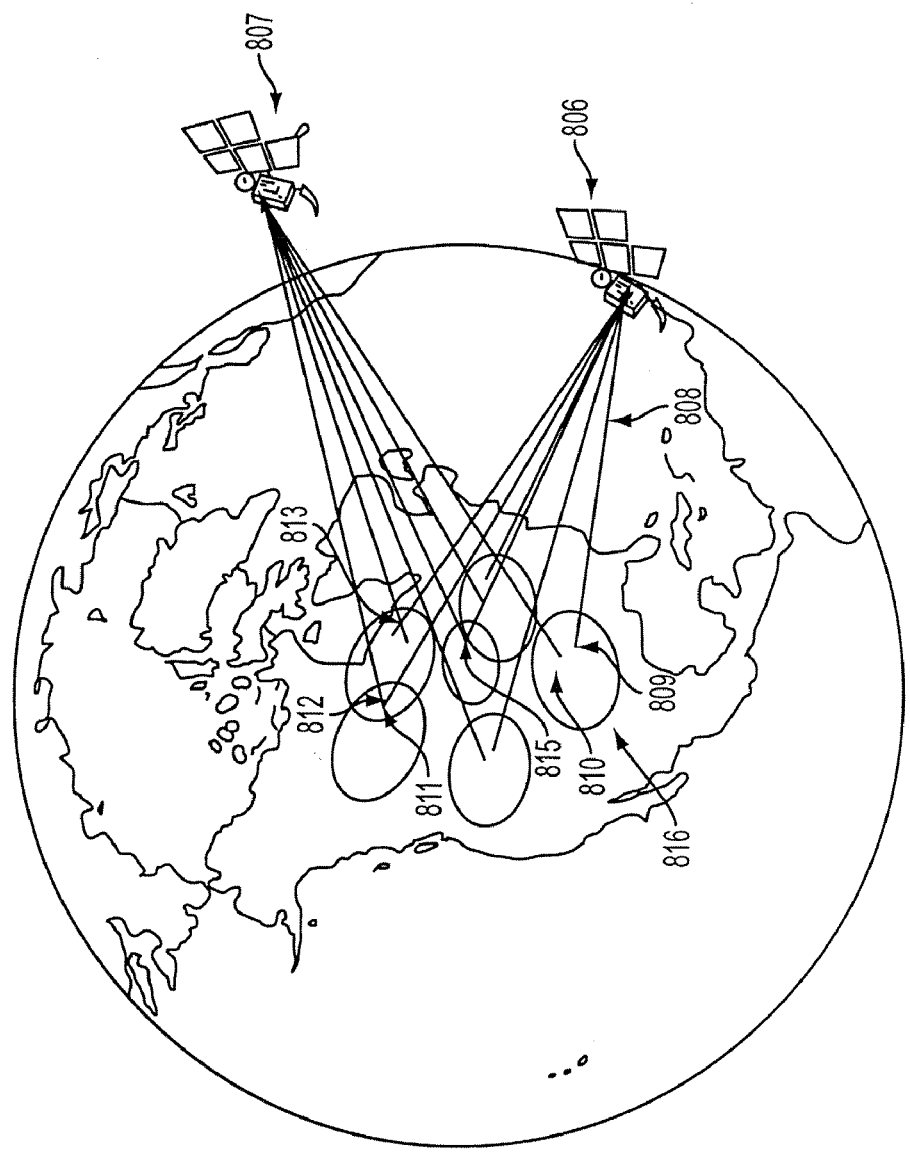
FIG. 8C illustrates how error regions of FIG. 8B can be so large and overlap in such a way that subsequent satellite motion does not provide a reliable means to distinguish spurious locations from the true one if phase tracking is used to generate the location estimates.

The set of ambiguous DOAs appearing on an output lead 1214 from DOA generator 1210 are passed to the ambiguous location estimator 1215. In this process the unit DOA vectors are extended from the satellite, for example, the satellite shown at location 806 in FIG. 8C, using satellite position data from an ephemeris signal block 1217, a table listing current, and future positions of certain celestial objects, including the satellite, relative to the earth's surface. This data may have to be converted from the ephemeris coordinates, typically perifocal, to ECI. If so, this is also done in the processor 1215 The surface is typically modeled according to the well known WGS84 ellipsoid; however, when desirable, any suitable model can be used. In particular significant terrain elevations can be incorporated. Further test are also done here on emitters near the horizon by checking the angle between the normal to the earth's surface at the candidate emitter and line of sight to the satellite. If the angle is greater than 90°, but pulling the location toward the edge of the error bound closest to the satellite reduces the angle, the potential emitter site is retained.

Figure 6B:
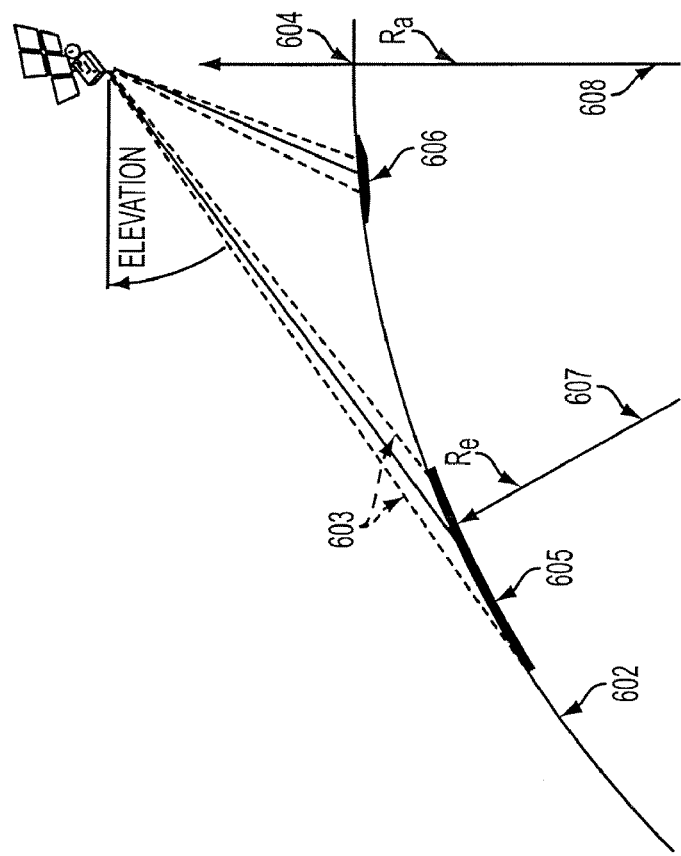
FIGS. 6A and 6B are illustrative of how the region of uncertainty grows due to the earth's curvature as transmitters move further and further from the satellite's suborbital position.
Figure 6A:
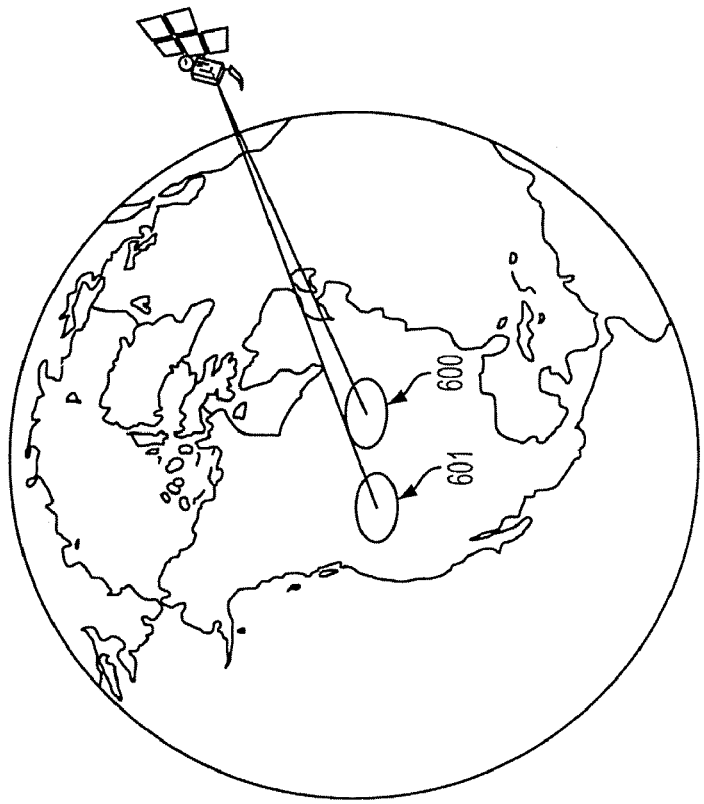
Figure 7A:
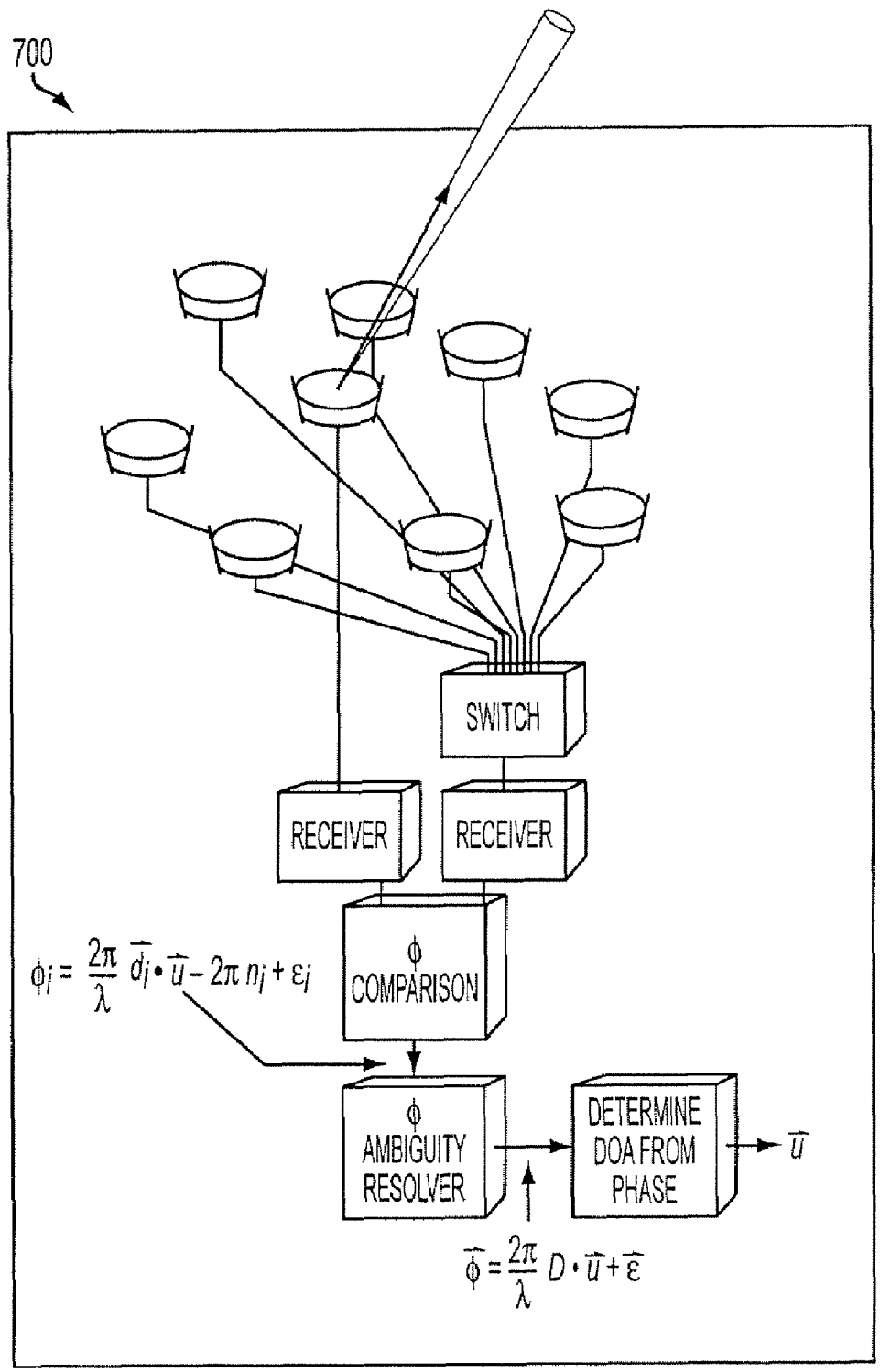
FIGS. 7A and 7B illustrate how simplifying the array of FIG. 5A by eliminating antennas from the array lattice shown in FIG. 4 creates a set of ambiguous emitter directions of arrival.
Figure 7B:
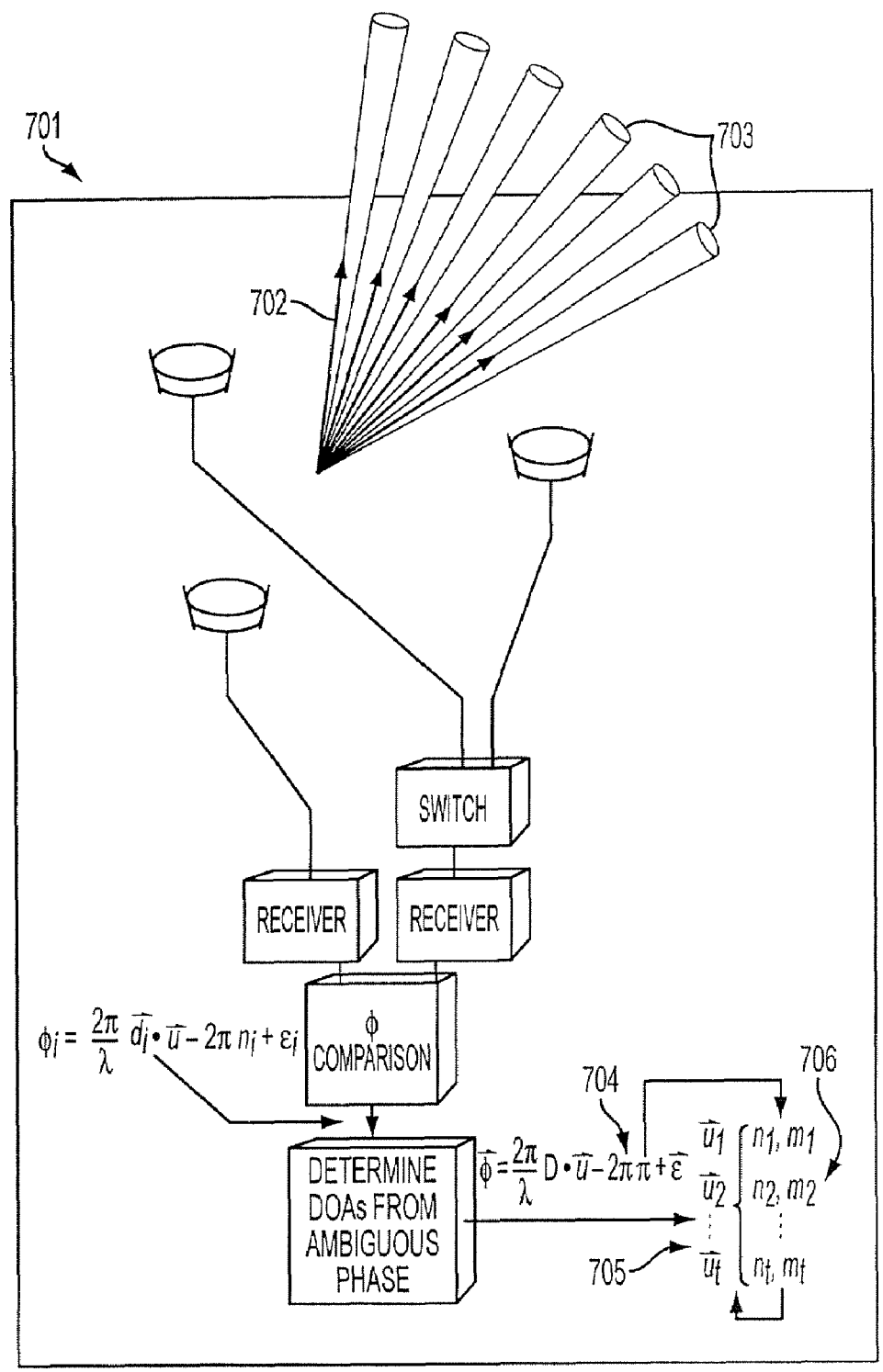

The candidate sites initialize a bank of recursive estimators or filters in the processor 1216 and are stored in a memory 1218. These stored sites are used when outputted on data line 1219 at the next phase measurement to predict the corresponding set of ambiguity location integers in signal block 1215, whereupon subsequent processing again occurs in the ambiguous DOA generator 1210. But it is essentially different from the processing for the first phase measurement vector described above, and this difference is a critical aspect of the invention. The stored site for candidate location i, $\vec{R}_{e_i}$, is used with the satellite position at the time of the updated phase measurement, $\vec{r}_s$ as shown by reference numerals 607 and 608 in FIG. 6B, obtained from the ephemeris, to compute the predicted DOA unit vector $\vec{u}_i$ according to the expression:

$$\vec{u}_i = \frac{(\vec{r}_s - \vec{R}_{e_i})}{\|\vec{r}_s - \vec{R}_{e_i}\|} \tag{2}$$

The phase $\phi_i$ is then predicted, using the interferometer baseline vector $\vec{d}$ stored in memory 1207 at the time of the current phase measurement, by:

$$\phi_{pred_i} = \frac{2\pi}{\lambda} \vec{d} \cdot \vec{u}_i \tag{3}$$

The predicted phase $\phi_{predi}$ is then modulo'd down to get the ambiguity integer. This is done for each baseline pair at each site $\vec{R}_{e_i}$. The resulting integer pairs generate a resolved phase $\phi_i$ for each site i.

These resolved phases, not DOA estimates, outputted on line 1214 now drive the emitter update carried out in signal processors 1215 and 1216. This method of generating resolved phase is used at each subsequent measurement update. The feed-forward and feedback process involved is clear from signals appearing on output signal lines 1214 and 2119 of FIG. 12.

Although estimates are ultimately in ECI, the estimators in processor 1216 themselves are cycled in topocentric-horizon south-east-up or SEZ coordinates local to each hypothesized emitter position. This is done to avoid the singularity problems that arise if earth-centered inertial is solely used, and to more easily incorporate the oblate spheroidal earth flattening constraint.

The SEZ coordinates are taken to have their origin at the initial location for each site, i.e.

$$R_{e_i}(t=o) = \begin{bmatrix} 0 \\ 0 \\ z \end{bmatrix} \tag{4}$$

and subsequent updates refine this estimate by $\Delta R_e$, where $$\Delta R_e = \begin{bmatrix} \Delta s \\ \Delta e \\ 0 \end{bmatrix} \tag{5}$$

Thus the elements of the filter state vector are the emitter south-offset $\Delta s$ and east-offset $\Delta e$. The location state update model equation takes the simple form:

$$\begin{bmatrix} \Delta s \\ \Delta e \end{bmatrix}_{k|k-1} = \begin{bmatrix} \Delta s \\ \Delta e \end{bmatrix}_{k-1|k-1} \tag{6}$$

The subscript k–1|k–1 denotes the estimate at phase sample k–1 after filter update with the phase measurement made at that time, while k|k–1 refers to extrapolation to the sample time at the $k^{th}$ update from the sample time at the k–1 update.

This is standard notation taught, for example, by Gelb in *Applied Estimation Theory*, M.I.T Press, Cambridge 1974, but this notation may possibly be misleading. Because the generally variable sample time T is not incorporated in the notation it can be misconstrued as implying T is fixed and samples occur at regularly spaced times kT, with k=1, 2 . . . . That is not the case in the subject invention, and the integer k simply refers to the update number in the sequence of measurements.

Equation 3 is the phase measurement equation associated with location state model Equation 6. It is inputted on signal lead 1214 to processor 1215 where it is associated with a correct filter in Update Location Each Site processor 1216. Because the measurement equation is a nonlinear function of the state elements it must be linearized to implement the filters, as explained in Gelb, supra. The linearization is not just a technical detail, but important in the computation of the Bayesian site probabilities in processor 1220. So it is expressed here as:

$$\begin{bmatrix} \varphi_1 \\ \varphi_2 \end{bmatrix}_k = \underbrace{\begin{bmatrix} -\vec{i}_1 + \dfrac{\left(\vec{i}_1 \cdot (\vec{r}_s(k) - \vec{R}_e(k|k-1))^T\right)}{\rho^2} \\ -\vec{i}_2 + \dfrac{\left(\vec{i}_2 \cdot (\vec{r}_s(k) - \vec{R}_e(k|k-1))^T\right)}{\rho^2} \end{bmatrix}}_{H_k} \begin{bmatrix} 1 & 0 \\ 0 & 1 \\ -c_s & -c_e \\ -c_z & -c_z \end{bmatrix} \begin{bmatrix} \Delta s \\ \Delta e \end{bmatrix}_k + \begin{bmatrix} \varepsilon_{dcosaoa_1} \\ \varepsilon_{dcosaoa_2} \end{bmatrix} \tag{7}$$

where $\rho = \left((\vec{r}_s(k) - \vec{R}_e(k|k-1))^T (\vec{r}_s(k) - \vec{R}_e(k|k-1))\right)^{\frac{1}{2}}$ is the estimated slant range, with $\vec{r}_s(k)$ the observer's location at sample k and, $$\begin{bmatrix} c_s \\ c_e \\ c_z \end{bmatrix} = D^T \begin{bmatrix} 1 & 0 & 0 \\ 0 & 1 & 0 \\ 0 & 0 & \dfrac{1}{(1-f)^2} \end{bmatrix} D \cdot R_e(k|k-1) \tag{8}$$

where f is the ellipsoid flattening constant.

Figure 1:
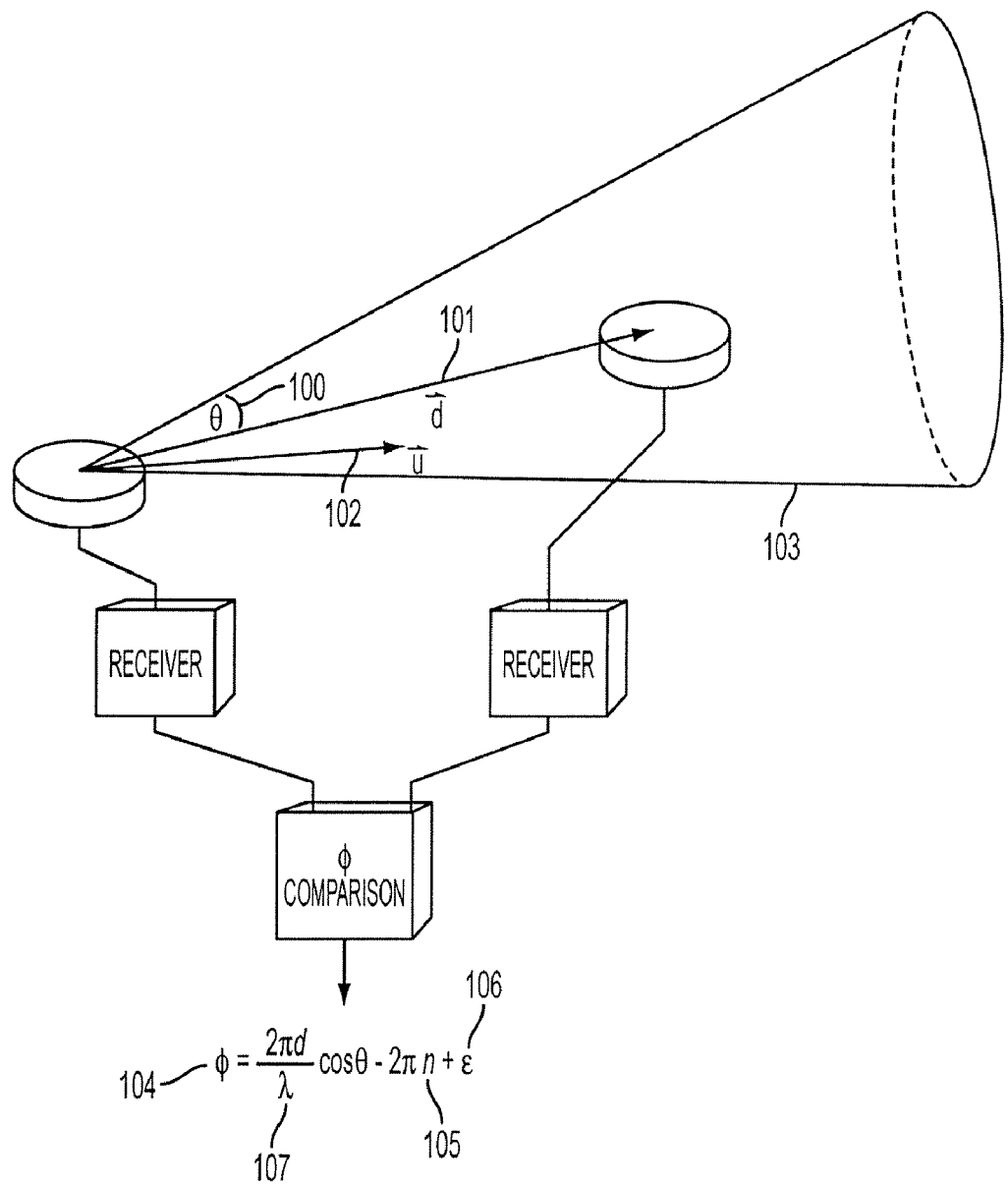
FIG. 1 is illustrative of a related art two element interferometer where the antenna spacing may be more than half the signal wave length apart so the phase measurement is modulo $2\pi$ ambiguous, and further illustrates that the signal direction of arrival for an ideal linear interferometer even with no phase measurement error is indeterminate in the sense that it may lie anywhere on the angle-of-arrival cone.
Figure 2:
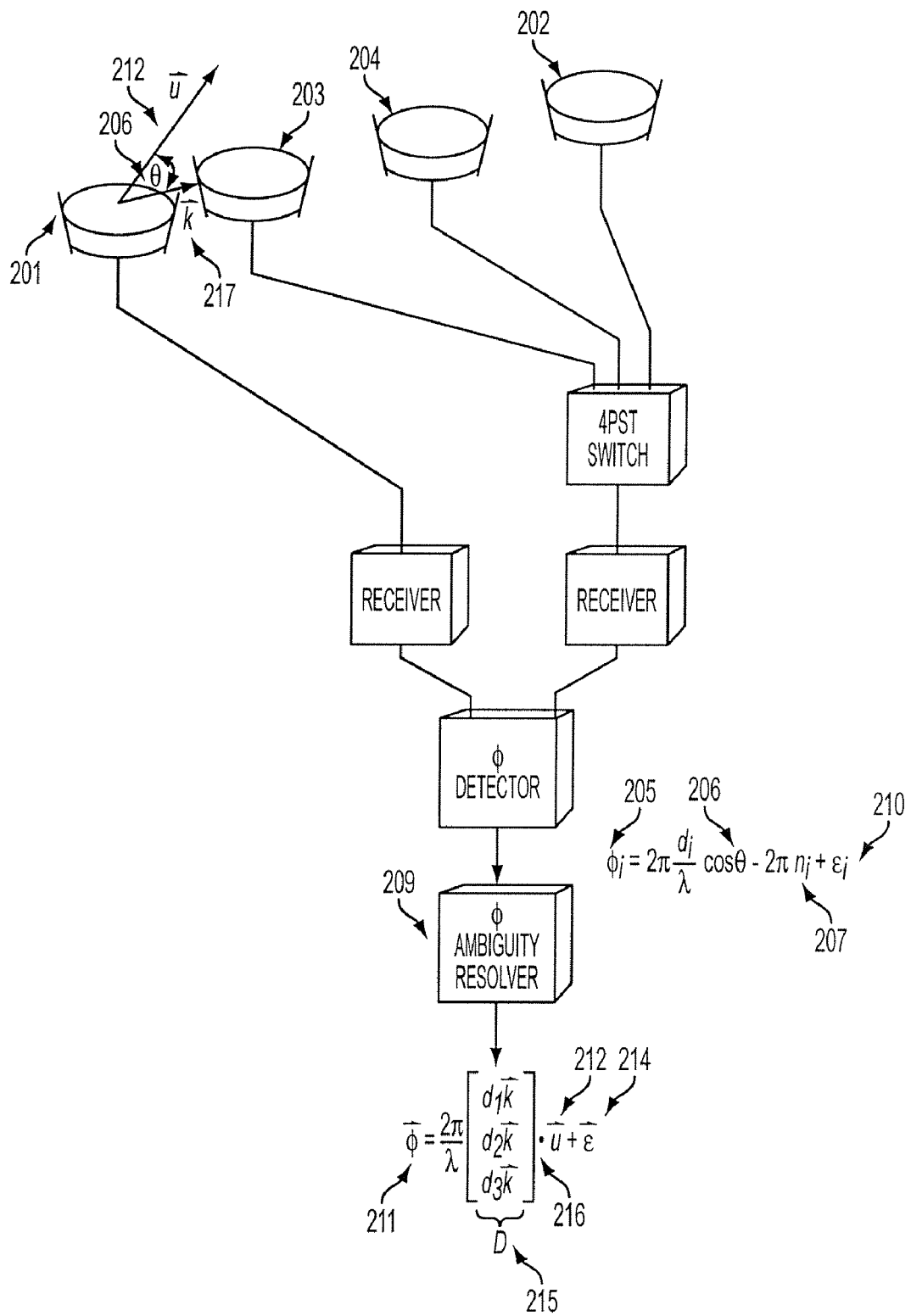
FIG. 2 shows how the phase measurement ambiguities in the two element interferometer of FIG. 1 are eliminated by adding additional antennas at smaller baseline spacings.
Figure 3:
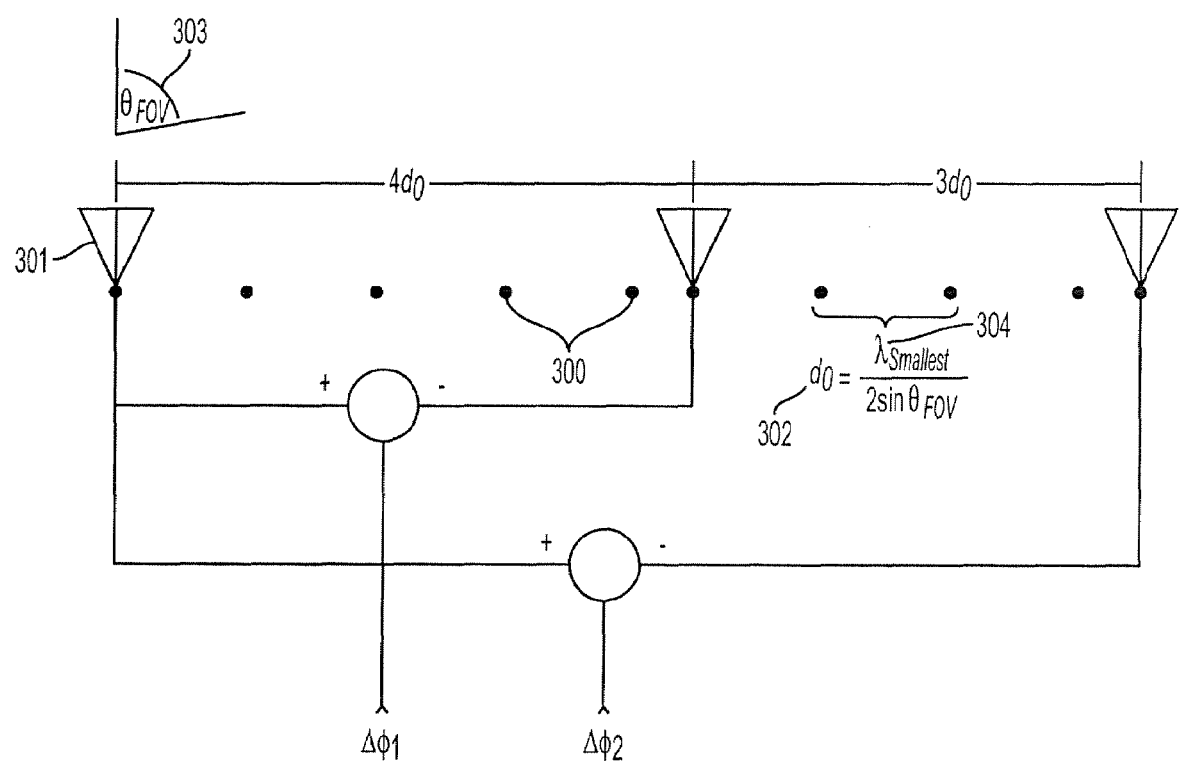
FIG. 3 depicts the restricted way additional antennas in FIG. 2 must be added according to the known related art comprising an approach that produces an array having the lowest quadratic cost.
Figure 4:
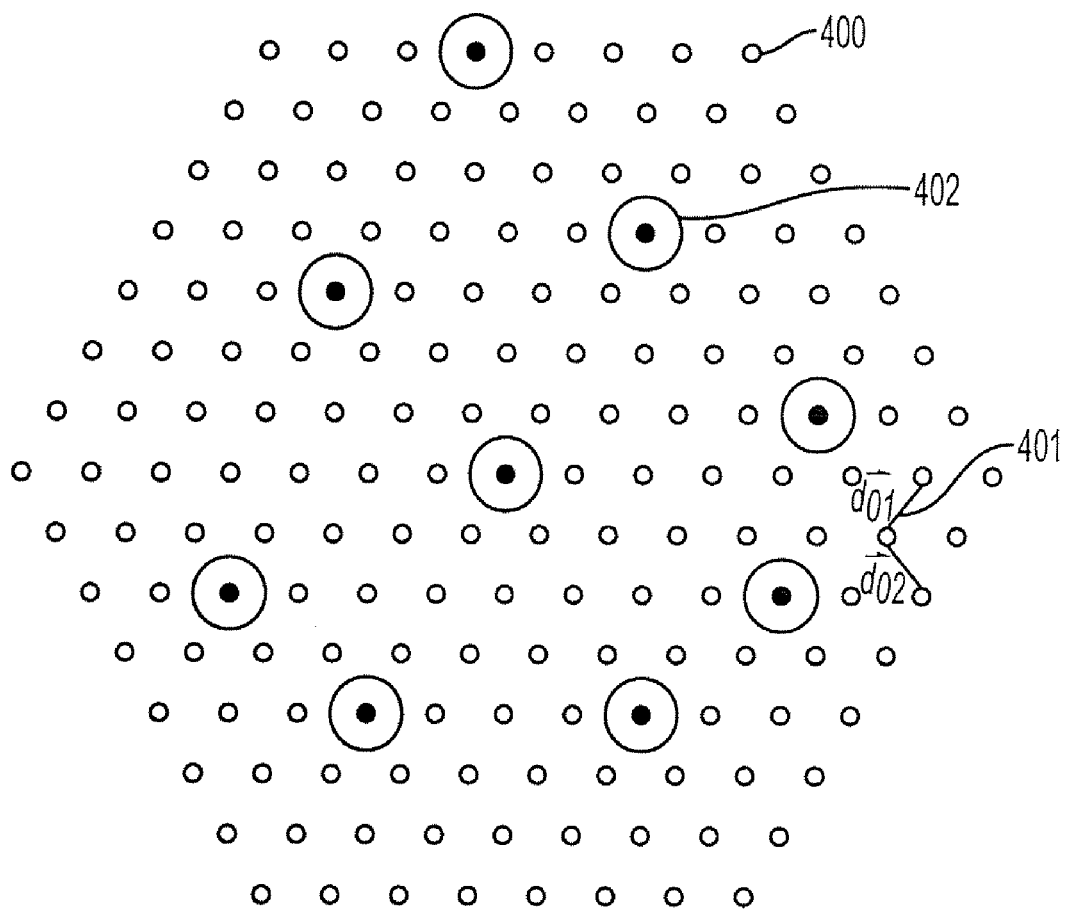
FIG. 4 illustrates how generalizing the approach shown in FIG. 3 to design an optimal planar interferometer array limits antenna placement.
Figure 5B:
FIGS. 5A and 5B show an implementation of the array shown in FIG. 4 using a two channel receiver.
Figure 5A:
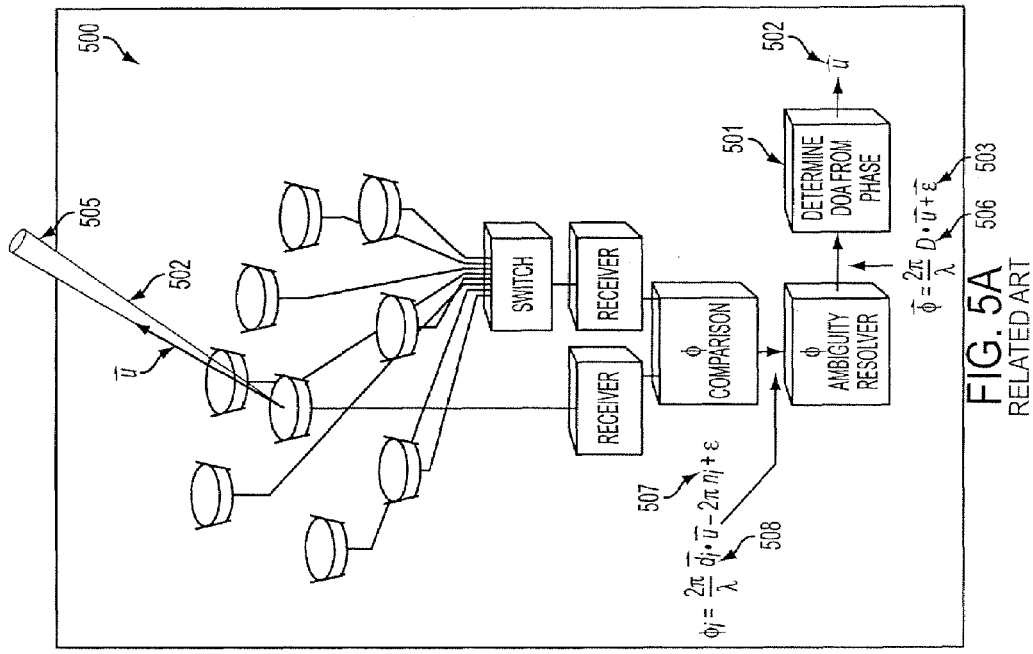

In equation (8), D the rotation from SEZ to earth fixed geocentric can be expressed as, $$D = \begin{bmatrix} \text{sinlatcoslon} & -\text{sinlon} & \text{coslatcoslon} \\ \text{sinlatsinlon} & \text{coslon} & \text{coslatsinlon} \\ -\text{coslat} & 0 & \text{sinlat} \end{bmatrix} \tag{9}$$

with lat and lon being the latitude and longitude corresponding to $R_e(k|k-1)$. The vectors $\vec{i}_1$ and $\vec{i}_2$ are the unit vectors along the interferometer baselines at sample k stored in memory 1207. Each is analogous to $\vec{k}$, shown in FIG. 2 by reference number 217. The computation of these unit vectors is done in ambiguous DOA generators 1210 and input to the estimators via signal line 1214.

The phase measurement, $$\begin{bmatrix} \varphi_1 \\ \varphi_2 \end{bmatrix}_k$$

input to the filter is normalized by $2\pi/\lambda$. Hence the notation is modified from the $\phi$ used to denote the unnormalized phase. The subscript in the phase errors:

$$\begin{bmatrix} \varepsilon_{dcosaoa_1} \\ \varepsilon_{dcosaoa_2} \end{bmatrix}$$

also reflects this normalization.

After cycling the filters for each site, the updated SEZ locations are input to processor 1215 where they are converted to ECI, and stored in memory 1218. These are not tested for the horizon constraint. An emitter that is beyond the horizon will produce a small probability in processor 1220 and be essentially neglected when performing the weighted average in Weighted Location Estimate processor 1221.

The probability determination in 1220 uses results from the SEZ iterative filters in 1216, particularly the predicted phase and statistics of the phase noise. It also uses the measured phase from memory 1205, passed through process 1216. For convenience assume the phase error to have the same channel-to-channel variance $\sigma_\phi^2$, determined from the signal SNR. With this simplifying assumption the phase errors from phase detector 1230 have a variance:

$$\Lambda_k = \begin{bmatrix} 1 & .5 \\ .5 & 1 \end{bmatrix} \sigma_\phi^2 \left(\frac{\lambda}{2\pi}\right)^2 \tag{10}$$

and the quantity, $$\vec{\Sigma} = \vec{\phi}_{meas} - \vec{\phi}_{pred_i} \tag{11}$$

has the theoretical variance of:

$$E\langle\sum^2\rangle_i = H_k^T E\left\{\begin{bmatrix} \Delta s \\ \Delta e \end{bmatrix}_{k-1|k-1} [\Delta s \ \Delta e]_{k-1|k-1}\right\} H_k + \Lambda_k \tag{12}$$

based on the estimator performance for the corresponding site in processor 1216. This variance estimate is passed on signal lead 1222 to Compute Bayesian Probabilities processor 1220. The predicted phase $\vec{\phi}_{pred}$ applied on input data line 1223 from the DOA processor 1210, and measured phase $\vec{\phi}_{meas}$ is applied on input data line 1224 from stored phase memory 1205.

Processor 1220 then generates for each site the Bayesian probability that the site is correct by comparing the actual measured offset (Equation 11) to the theoretical variance of the offset obtained by Equation 12, i.e., it generates the ratio:

$$\Upsilon_i = (\vec{\varphi}_{meas} - \vec{\varphi}_{pred_i})^T E\langle\sum^2\rangle_i^{-1} (\vec{\varphi}_{meas} - \vec{\varphi}_{pred_i}) \tag{13}$$

and applying Bayes Rule, computes the probability for the site recursively by the expression:

$$prob(\text{site}_i)_k = E\langle\sum^2\rangle_i^{-1} e^{-\frac{\Upsilon}{2}} prob(\text{site}_i)_{k-1} \tag{14}$$

The probabilities computed at update k are stored in memory 1218 via data line 1225 for use in the next recursion. The set of all updated probabilities is passed to Find Weighted Location Estimate calculation means 1221 and Find Maximum Likelihood Location Estimate calculation means 1226.

The ratio $\Upsilon_i$ (Equation 13) measures the accuracy of the phase prediction $\phi_{pred_i}$ (Equation 3). The theoretical variance values generated in accordance with Equation 12 assume the ambiguity resolution is perfect. If a significantly wrong site provides the DOA vector projected onto the interferometer baseline to predict the phase and hence ambiguity integer, $\Upsilon_i$ will be large, and the recursion computed per Equation 14 will reduce the probability at each update.

But predicting the correct ambiguity integer does not require precise emitter location. Therefore, at an emitter frequency where the satellite baseline lengths generate many ambiguous sites, several sites near the correct location will predict the correct ambiguity pair over successive updates. So a second important property of the ratio $\Upsilon_i$ is that it acts like a vernier, measuring the fidelity of the site location given the correctly resolved phase.

Because the probabilities will vary over the correctly resolved sites according to their update-to-update performance, this vernier property ensures that doing a weighted average in processor 1221 of FIG. 12 gives an accurate emitter estimate before the array is resolved.

Thus the dual behavior of the probability calculation, in essence weighing sites according to both an error in ambiguity resolution, or, if that is correct, in site initialization, is essential to the subject invention. In particular it allows the use of calibrated but unresolved baselines to generate relatively high location accuracy even at high frequencies because the many spurious sites near the true site of the emitter will not significantly degrade the final weighted location estimate provided by processor 1221.

Processor 1226 determines the maximum probability and outputs an estimate computed in processor 1216 for the corresponding site. This is compared in processor 1228 with the weighted estimate calculated in estimator 1221, and if the two are statistically close, then a single site is applied on signal line 1229 for use in all ensuing updates, for example, in processors 1215 and 1216. The estimation collapses from a bank of filters to the single filter for that site. This greatly aids throughput processing in a dense emitter environment. It is thus important to take advantage of the statistical equivalence of the two estimates when it occurs, but this feature is not intrinsically required by the subject invention. The comparison is performed in processor 1228 because this process also transforms the estimates from ECI to geodetic coordinates for the signal output appearing on signal lead 1227 of FIG. 12.

As noted above, a significant benefit of the subject invention is that it provides accurate geolocation before the comparison in processor 1228 determines the array is essentially resolved. This is vital because noncooperative emitters may not remain on, or may not be in the array's field of view (FOV) long enough to resolve the array. Therefore it is essential that an embodiment of the subject invention include this constraint. The following example illustrates the preferred approach in the system design process. The following example further illustrates how the subject invention can achieve the performance of a fully resolved planar interferometer array with only three antennas. A significant benefit is obtained when the design is carried out iteratively.

The first step in this iterative process is to determine the most difficult transmitters to locate for a particular application. These transmitters are the set formed by those at the lowest frequency, shortest transmit times, and farthest from the satellite suborbital point. This set is referred to as the design determining set, or DDS. The number of transmitters that must be detected and geolocated, called the emitter density, establishes the average emitter revisit rate or expected interval between phase measurement sample times for the same emitter by the receiver 1201 shown in FIG. 12. For typical densities, the sample times can be on the order of 1 to 5 seconds. The emitters with the shortest transmit times then determine the smallest number of iterations available to cycle the estimator filter block 1216. For example, if the lower bound for on-times is 10 seconds, then a sample rate of 0.5 Hz means 5 measurement samples must be available, or equivalently 5 location filter iterations must occur. Using this information in combination with data on the lowest frequency and farthest transmitters allows a hypothetical design of a conventional interferometer array to solve the geolocation problem.

The best method for designing this hypothetical array is to utilize Malloy's optimal approach. Such an array will not be implemented; however, the predicted location performance against the DDS emitters using a single estimator and a fully resolved array provides the basis in the subject invention for placing antennas $1200_1$-$1200_3$ in a three element ambiguous array along with the requirement of determining the receiver calibration and array calibration with calibration elements 1202 and 1211 as shown in FIG. 12.

This is achieved as follows. The three antenna elements $1200_1$, $1200_2$ and $1200_3$ of the ambiguous array are first taken as a subset of an optimal array. Predicted geolocation performance against the design driving set is thus generated. In doing this the implementation is constrained to use the same number of iterations against each emitter used by the optimal array. From the slant range accuracies thus produced, and the corresponding results for the optimal resolved array, a ratio is computed for each DDS emitter. This ratio is the ambiguous array slant range error divided by the resolved array slant range error.

Using the largest of these ratios, the baselines for the three element array baselines are increased. This scaling now takes into account viable antenna placement on the satellite. Ideally the baselines will be scaled according to the largest ratio. But typically other installations on the satellite's surface do not allow this. So the calibration procedures carried with the calibration elements 1202 and 1211 must be enhanced to proportionally compensate. The result of this step is a system producing location estimates from an unresolved array that performs the same as a conventional installation using a fully resolved interferometer.

Table I and Table II show results using the design method described above for the simple case of a single 6 GHz emitter and where the only trade-off is performance at various ranges. Table I summarizes the results of the first step of generating DDS ratios.

TABLE I

Ambiguous Interferometer Baseline Length: 45.7 cm
Ambiguous Array Phase error RMS Standard Deviation: 15.3°
Resolved Interferometer Baseline Length: 45.7 cm
Resolved Array Phase error RMS Standard Deviation: 15.3°
Frequency 6 GHz

| Range from Sub Orbital Point (nmi) | Resolved Array Performance (km) | Ambiguous Array Performance (km) | DDS Scale Factors |
|---|---|---|---|
| 400 | 1.6 | 4.3 | 2.7 |
| 800 | 3.4 | 9.5 | 2.8 |
| 1200 | 3.8 | 13.1 | 3.4 |

Note the scale factors are not the same for all ranges. Suppose the transmitter at 1200 km is the most important. Then the location performance of the ambiguous array lags that of the hypothetical optimal array by a factor of 3.4. The difference in performance is due to the ambiguous array not having enough receiver dwells, and hence location iterations 1216 to converge to a single emitter in processor 1228. So the difference is due to "smearing" in the weighted average estimate found in computation block 1221 compared to the optimal array's single site estimate. However, performance can be adjusted by a combination of proportionally increasing the baseline lengths and decreasing the phase error.

In this example, assume adequate space exist on the satellite surface to double the baseline lengths. This will not reduce the slant range error to the value desired so the phase error must also be reduced. The 15.3 edeg error assumes only very rudimentary antenna calibration in processor 1211. If this calibration is enhanced by generating a larger cal table during the installation process, a phase error standard deviation of 10.1° can be achieved. This gives the result shown in Table II.

TABLE II

Ambiguous Interferometer Baseline Length: 92 cm
Ambiguous Array Phase error RMS Standard Deviation: 10.1°
Resolved Interferometer Baseline Length: 45.7 cm
Resolved Array Phase error RMS Standard Deviation: 15.3°
Frequency 6 GHz

| Range from Sub Orbital Point (nmi) | Resolved Array Performance (km) | Ambiguous Array Performance (km) |
|---|---|---|
| 400 | 1.6 | 0.67 |
| 800 | 3.4 | 3.4 |
| 1200 | 3.8 | 4.1 |

Although a simple example is shown, it should be clear from this how flexibility in antenna placement combined with well established calibration and installation techniques in the subject invention allow the geolocation of emitters to whatever practical accuracy is desired.

The foregoing detailed description merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. A method of determining the true location of an emitter by an array of sensors each detecting signals from the emitter and including means for processing data from the array and generating therefrom information indicative of emitter location, wherein the array of sensors comprises an incomplete array and a set of multiple possible emitter locations is initially generated, with one location of the set being, within sensor measurement error, the true location, and where the remaining locations of the set comprise ambiguous spurious locations of the emitter that cannot be distinguished from the true location of the emitter, and where the true location is subsequently determined without necessarily uniquely resolving location ambiguity; comprising the steps of:
   (a) measuring a set of initial incomplete array data at an initial array location;
   (b) initializing a location estimator for all possible emitter site locations;
   (c) determining and storing estimates of all said emitter site locations associated with said set of initial incomplete array data where one of said estimates is, within said sensor measurement error, the true emitter site location;
   (d) moving the sensor array relative to the emitter,
   (e) measuring another set of incomplete array data at the subsequent array location;
   (f) predicting from each emitter site location determined in step (c) the data measured in step (e);
   (g) associating uniquely the array data from step (e) with an emitter site from step (c) by utilizing the predicted data from step (f);
   (h) altering the measured data from step (e) utilizing the associated predicted data from step (g), so the altered data is, to within said sensor measurement error, data that would be measured by a complete array of sensors if the emitter were located at the associated, possibly spurious, site;
   (i) inputting the respective altered associated data from step (h) into the corresponding location estimator from step (b), updating each estimate of emitter site location initialized in step (b), and generating updated predicted measurement data;
   (j) replacing each stored location estimate of step (c) with the respective updated emitter site location estimate from step (i);
   (k) comparing the updated predicted data from step (i) with the measured data from step (e), and determining a probability for each updated emitter site location estimate that each said location estimate is the true emitter site location of said one emitter; and
   (l) generating an estimate of said true emitter site location based on the probability determined in step (k).

2. The method of determining the true location of an emitter in accordance with claim 1 additionally including a step (m) of repeating step (d) through step (l) until the estimate from step (l) converges, within said sensor measurement error and a processing error tolerance, to the true emitter location.

3. A method of locating a terrestrial emitter of electromagnetic radiation at a satellite in an orbit about the earth, comprising the steps of:
   (a) initially detecting a signal from said emitter at the satellite during a first predetermined dwell time;
   (b) measuring the difference in phase of the wavefront of the detected signal from said emitter arriving at pairs of antennas selectively located on the satellite, wherein the measured phase difference is sufficient to produce a set of direction of arrival (DOA) vectors with one vector of the set, within a measurement error, being the true direction of arrival of the detected signal from said emitter;
   (c) generating a set of all possible phase measurement ambiguity integers, one for each antenna pair, consistent with the frequency of the signal from said emitter and the orientation of the pair of antennas during step (b) and, wherein one subset of said set of ambiguity integers includes a true subset of ambiguity integers;
   (d) determining all possible DOA vectors by resolving the phase with each ambiguity integer associated with said subset of ambiguity integers;
   (e) determining and storing estimates of all possible emitter site locations associated with said set of DOA vectors and where one of said estimates is, within said measurement error, the true emitter site location;
   (f) initializing a location estimator for each said possible emitter site of said set of possible emitter sites;
   (g) detecting the signal from said emitter again during a second predetermined dwell time following said first dwell time wherein the satellite has moved in its orbit relative to said emitter, and then measuring the phase difference during said second time interval according to step (b);
   (h) generating a new set of phase measurement ambiguity integers during said second predetermined dwell time following the movement of the satellite in step (g);
   (i) predicting a new set of DOA vectors, utilizing the stored emitter estimated positions from step (e) and the satellite orbital position following the phase difference measuring step in step (g);
   (j) predicting a new subset of phase measurement ambiguity integers with each new DOA vector consistent with the orientation of said pair of antennas during said second dwell time;
   (k) resolving the measured phase difference of step (g) with each ambiguity integer of said new subset of phase measurement ambiguity integers generated in step (h);
   (l) inputting the respective resolved measured phase difference of step (k) into the respective location estimator initialized in step (fl, and updating each estimate of emitter site location initialized in step (f);
   (m) replacing each stored location estimate of step (e) with the respective updated emitter site location estimate;
   (n) determining a probability for each updated emitter site location estimate by determining a likelihood that each said location estimate is the true emitter site location of said one emitter;
   (o) generating an estimate of said true emitter site location based on the probability determined in step (o); and
   (p) repeating step (g) through step (o) until the estimate from step (o) converges, within said measurement error and a predetermined processing error tolerance, to the true emitter location.

4. A method of locating terrestrial emitters of electromagnetic radiation using a calibrated but ambiguous interferometer array mounted on a satellite, the satellite being in an orbit producing translational motion of the array relative to one or more of said emitters on the earth's surface, the method comprising the steps of:
   (a) controlling a tuning frequency of an intercept receiver on the satellite to detect diverse emitters, and upon detecting a transmitted signal from said one or more emitters associating a respective unique tuning frequency with each detected emitter;

(b) measuring the phase difference of the signal wavefront of said transmitted signal intercepted by an antenna array, where the phase difference is measured modulo one phase cycle, and provides a set of ambiguous direction of arrival (DOA) vectors for the detected emitter, and wherein one vector of said set of DOA vectors within a measurement error, being the true direction of arrival DOA for the one emitter associated with the phase measurements;

(c) generating a set of all possible phase measurement ambiguity integers, consistent with emitter intercept or tuning frequency and orientation of said antennas, during the phase difference measuring step of step (b), and wherein one subset of ambiguity integers of said set of ambiguity integers includes a subset of true ambiguity integers correctly resolving the modulo one cycle phase measurement ambiguities for the associated emitter;

(d) determining all possible DOA vectors from the ambiguous measured phase utilizing all said ambiguity integers;

(e) determining and storing estimates of all possible emitter site locations associated with said DOA vectors and where one estimate is, within a predetermined measurement error, the true emitter site location for the detected emitter associated with that set;

(f) tuning the intercept receiver, utilizing said associated unique tuning frequency and at least one other signal characteristic of said one or more detected emitters to detect the transmitted signals from said one or more emitters following movement of said satellite relative to said one or more emitters; then for each;

(g) measuring a new set of ambiguous phase differences and generating a new set of ambiguity integers per steps (b) and (c);

(h) adjusting the stored previous estimate of said emitter site locations from step (e) so as to account for the earth's rotation during the orbital movement of said satellite in step (f);

(i) generating a new set of DOA vectors utilizing the adjusted stored emitter site location estimates and satellite orbital position at the new receiver dwell time, (j) generating with each DOA vector of said new set of DOA vectors, a new set of ambiguity integers in response to the orientation of said antenna array at the new receiver dwell time;

(k) updating or resolving the ambiguous measured phase differences from step (g) with said new set of ambiguity integers;

(l) initializing an emitter site location estimator or location filter for each DOA vector of said new set of DOA vectors;

(m) updating each estimate of possible emitter site locations established in step (l) by inputting the respective phase differences resolved in step (k);

(n) replacing each stored location estimate in step (e) with said updated emitter site location estimate;

(o) determining a value of the probability or likelihood that one of the updated emitter site locations is a true location;

(p) generating an estimate of the true emitter site location utilizing said probability or likelihood values determined in step (o); and (q) repeating the steps (f)-(k) and steps (m)-(p) while the emitter is detected in step (f).

5. A method of locating a terrestrial emitter of electromagnetic radiation on the earth's surface using a calibrated but ambiguous antenna array interferometer mounted on a satellite, the satellite being in an orbit producing translational motion of the array relative to said emitter, comprising the steps of:

(a) detecting a transmitted signal from said emitter during an initial receiver dwell time;

(b) measuring the phase difference of the signal wavefront of said transmitted signal intercepted by an antenna array located on the satellite, where the phase measured is sufficient to produce a set of direction of arrival (DOA) vectors, and wherein one vector of said DOA vectors within a measurement error, being the true direction of arrival DOA;

(c) generating a set of all possible phase measurement ambiguity integers, consistent with emitter frequency and orientation of said antenna array during the phase difference measuring step of step (b), and wherein one subset of ambiguity integers of said set of ambiguity integers includes a subset of true ambiguity integers;

(d) determining all possible DOA vectors utilizing all said ambiguity integers;

(e) determining and storing estimates of all possible emitter site locations associated with said DOA vectors and where one estimate is within a measurement error, the true emitter site location;

(f) initializing an emitter site location estimator or location filter for each estimated emitter site from step (e) during said new dwell time;

(g) detecting a transmitted signal from said emitter during a new receiver dwell time utilizing the frequency and other signal characteristics of said one emitter, following subsequent translational movement of said satellite relative to said emitter;

(h) measuring a new set of ambiguous phase differences and generating a new set of ambiguity integers per steps (b) and (c);

(i) adjusting the stored previous estimate of said emitter site locations so as to account for the earth's rotation during the orbital movement of said satellite in step (g);

(j) generating a new set of DOA vectors utilizing the adjusted stored emitter site location estimates and satellite orbital position during the new receiver dwell time;

(k) generating with each DOA vector of said new set of DOA vectors, a new set of ambiguity integers in response to the orientation of said at least one pair of antennas at the new receiver dwell time;

(l) updating the measured phase differences with said new set of ambiguity integers;

(m) updating each estimate of possible emitter site locations by inputting the respective phase differences resolved in step (k) into the respective estimator initialized in step (f);

(n) replacing each stored location estimate in step (e) with the respective updated emitter site location estimate;

(o) determining a value of the probability or likelihood that one of the updated emitter site locations is the true emitter site location;

(p) generating an estimate of the true emitter site location utilizing said probability or likelihood values determined in step (o); and (q) tuning the intercept receiver and detecting the transmitter signal for multiple successive orbital movements of said satellite relative to said emitter, and repeating the steps (g)-(p).

6. The method of claim 5 where the step (p) of generating an estimate of the true emitter site location utilizes the probability or likelihood values as weights further comprises computing a weighted average of all of the individual probability or likelihood values.

7. The method of claim 5 where the step (p) of generating an estimate of the true emitter site location includes utilizing the probability or likelihood values and then determining the emitter site location estimate having the maximum probability value.

8. The method of claim 5 wherein the step (p) of generating an estimate of the true emitter site location further comprises: (i) utilizing the probability or likelihood values as weights and then computing a weighted average of all of the individual probability or likelihood values, and (ii) utilizing the probability or likelihood values and then determining the emitter site location estimate having the maximum probability value.

9. The method of claim 5 further comprising (r) of terminating the method when the weighted average estimate value and the maximum probability value are, within a predetermined estimation statistical error, substantially the same.

10. The method of claim 5 wherein the individual emitter site location estimates are stored in earth-centered inertial (ECI) coordinates, and thereafter rotated in ECI coordinates to adjust for the time between successive receiver phase measurements of steps (b) and (g).

11. The method of claim 5 wherein the individual emitter site location estimates are initialized in step (f) and updated in step (m) in local south-east-up or SEZ coordinates.

12. The method of claim 5 wherein said interferometer includes at least two antenna elements.

13. The method of claim 5 wherein said interferometer includes three antenna elements.

14. The method of claim 5 wherein said interferometer includes a plurality of antenna elements, and wherein said antenna elements are placed at locations with spacings at relatively prime integer multiples, where the spacings are along one, two, or three dimensions.

15. The method of claim 5 wherein each array of the interferometer array comprises two antenna elements and an interferometer baseline generated by a satellite latitude change.

16. The method of claim 5 wherein the interferometer array comprises two non-coboresited or squinted antennas, wherein said two antennas are switched to either of two orthogonal polarization modes, with an ambiguous phase measurement being made between the two antennas for both of said modes and an elevation measurement being made by comparing the two sets of phase measurements.

17. The method of claim 5 wherein the antennas of the interferometer array have a variable separation distance requiring an additional step of (s) determining the position of said antenna with respect to the satellite in the phase difference measuring steps (b) and (h).

18. The method of claim 5 wherein the intercept receiver comprises a two channel receiver.

19. The method of claim 5 wherein the intercept receiver comprises a single channel receiver including a storage device for storing phase difference measurements measured in step (b) and following measurements in step (h) being made relative to a precision internal clock.

20. The method of claim 19 wherein the storage device comprises a digital RF memory.

21. The method of claim 5 wherein the measurements of phase difference of steps (b) and (h) are generated by one antenna relative to a precision internal clock, and wherein interferometer baselines are generated by comparing phase measurements made relative to the internal clock at different satellite attitudes.

22. The method of claim 5 wherein the antenna elements forming the interferometer array comprises a subset of the total set of antenna elements required to form a fully populated and resolved interferometer, and where some integers determined in step (c) and step (k) are determined by conventional interferometer array processing.

23. The method of claim 5 wherein the step (o) of determining the value of the probability or likelihood includes determining the accuracy of the ambiguity resolution for each site location, and, if the accuracy resolution is correct, further including the step (g) of determining the accuracy of each emitter site location estimate.

24. Apparatus for locating a terrestrial emitter of electromagnetic radiation at a satellite in an orbit about the earth:
(a) means for initially detecting a signal from said emitter at the satellite;
(b) means for measuring the difference in phase of the wavefront of the detected signal from said emitter arriving at least one pair of antennas selectively located on the satellite, wherein the measured phase difference is sufficient to produce a set of direction of arrival (DOA) vectors, with one vector of the set, being the true direction of arrival of the detected signal from one of said emitter;
(c) means for generating a set of all possible phase measurement ambiguity integers consistent with the frequency of the signal from said emitters and the orientation of the pair of antennas and wherein one subset of said set of ambiguity integers includes a true subset of ambiguity integers;
(d) means for determining all possible DOA vectors by resolving the phase with each ambiguity integer associated with said subset of ambiguity integers;
(e) means for determining and storing estimates of all possible emitter site locations associated with said set of DOA vectors, and where one of said estimates is a true emitter site location;
(f) means for detecting the signal from the emitter again after the satellite has moved in its orbit relative to the emitter;
(g) means for generating a new set of phase ambiguity integers; (h) means for adjusting the stored estimates of emitter site locations to account for the earth's rotation during satellite orbital movement;
(i) means for predicting a new set of DOA vectors, utilizing the adjusted stored estimates a current satellite orbital position of the satellite;
(j) means for predicting a new subset of ambiguity integers with each new DOA vector consistent with the orientation of said pair of antennas;
(k) means for resolving the measured phase difference with each new ambiguity integer of said subset of ambiguity integers;
(l) means for initializing a location estimator for each said DOA vector of said first set of DOA vectors;
(m) means for inputting the respective resolved measured phase difference, means for updating each estimate of emitter site location, and means replacing each stored location estimate with a respective updated emitter site location estimate;
(n) means for determining a probability or likelihood that one updated location estimate is the true emitter site location of said one emitter; and
(o) means for generating an estimate of said true emitter site location based on the probability or likelihood determined in step (n).

* * * * *